United States Patent
Dahi et al.

(10) Patent No.: US 11,388,385 B2
(45) Date of Patent: Jul. 12, 2022

(54) PRIMARY AND AUXILIARY IMAGE CAPTURE DEVICES FOR IMAGE PROCESSING AND RELATED METHODS

(71) Applicant: 3DMedia Corporation, Research Triangle Park, NC (US)

(72) Inventors: Bahram Dahi, Chapel Hill, NC (US); Tassos Markas, Chapel Hill, NC (US); Michael McNamer, Apex, NC (US); Jon Boyette, Holly Springs, NC (US)

(73) Assignee: 3DMedia Corporation, Research Triangle Park, NC (US)

( * ) Notice: Subject to any disclaimer, the term of this patent is extended or adjusted under 35 U.S.C. 154(b) by 0 days.

(21) Appl. No.: 17/140,126

(22) Filed: Jan. 3, 2021

(65) Prior Publication Data

US 2021/0266516 A1    Aug. 26, 2021

Related U.S. Application Data

(63) Continuation of application No. 16/261,513, filed on Jan. 29, 2019, now Pat. No. 10,911,737, which is a (Continued)

(51) Int. Cl.
*H04N 13/204* (2018.01)
*G06T 7/593* (2017.01)
(Continued)

(52) U.S. Cl.
CPC .......... *H04N 13/204* (2018.05); *G06T 7/593* (2017.01); *H04N 5/23254* (2013.01);
(Continued)

(58) Field of Classification Search
CPC ......... G06T 7/73; G06T 5/003; H04N 13/122; H04N 13/133; H04N 13/25
See application file for complete search history.

(56) References Cited

U.S. PATENT DOCUMENTS

| 3,503,316 A | 3/1970 | Takano |
| 3,953,869 A | 4/1976 | Wah Lo |

(Continued)

FOREIGN PATENT DOCUMENTS

| EP | 1056049 A2 | 11/2000 |
| EP | 1240540 B1 | 2/2011 |

(Continued)

OTHER PUBLICATIONS

Response to Final Office Action in related U.S. Appl. No. 13/115,589 dated Nov. 9, 2011. (22 pages).

(Continued)

*Primary Examiner* — Jeremiah C Hallenbeck-Huber
(74) *Attorney, Agent, or Firm* — Olive Law Group, PLLC

(57) ABSTRACT

Disclosed herein are primary and auxiliary image capture devices for image processing and related methods. According to an aspect, a method may include using primary and auxiliary image capture devices to perform image processing. The method may include using the primary image capture device to capture a first image of a scene, the first image having a first quality characteristic. Further, the method may include using the auxiliary image capture device to capture a second image of the scene. The second image may have a second quality characteristic. The second quality characteristic may be of lower quality than the first quality characteristic. The method may also include adjusting at least one parameter of one of the captured images to create a plurality of adjusted images for one of approximating and matching the first quality characteristic. Further, the method may include utilizing the adjusted images for image processing.

8 Claims, 21 Drawing Sheets

Related U.S. Application Data continuation of application No. 13/751,203, filed on Jan. 28, 2013, now Pat. No. 10,200,671, which is a continuation-in-part of application No. 13/584,744, filed on Aug. 13, 2012, now Pat. No. 8,441,520, which is a continuation of application No. 13/115,589, filed on May 25, 2011, now Pat. No. 8,274,552.

(60) Provisional application No. 61/427,278, filed on Dec. 27, 2010.

(51) Int. Cl.
- H04N 5/232 (2006.01)
- H04N 13/239 (2018.01)
- H04N 13/128 (2018.01)
- H04N 13/25 (2018.01)
- H04N 13/00 (2018.01)

(52) U.S. Cl.
CPC ....... *H04N 5/23267* (2013.01); *H04N 13/128* (2018.05); *H04N 13/239* (2018.05); *H04N 13/25* (2018.05); *G06T 2207/10016* (2013.01); *H04N 2013/0081* (2013.01)

(56) References Cited

U.S. PATENT DOCUMENTS

| | | |
|---|---|---|
| 4,661,986 A | 4/1987 | Adelson |
| 4,956,705 A | 9/1990 | Wright |
| 4,980,762 A | 12/1990 | Heeger |
| 5,043,806 A | 8/1991 | Choquet |
| 5,107,293 A | 4/1992 | Sekine et al. |
| 5,144,442 A | 9/1992 | Ginosar et al. |
| 5,151,609 A | 9/1992 | Nakagawa |
| 5,305,092 A | 4/1994 | Mimura |
| 5,369,735 A | 11/1994 | Thier |
| 5,444,479 A | 8/1995 | Fernekes |
| 5,511,153 A | 4/1996 | Azarbayejani |
| 5,603,687 A | 2/1997 | Hori |
| 5,613,048 A | 3/1997 | Chen |
| 5,652,616 A | 7/1997 | Chen |
| 5,673,081 A | 9/1997 | Yamashita |
| 5,678,089 A | 10/1997 | Bacs, Jr. |
| 5,682,437 A | 10/1997 | Okino |
| 5,719,954 A | 2/1998 | Onda |
| 5,734,743 A | 3/1998 | Matsugu |
| 5,748,199 A | 5/1998 | Palm |
| 5,777,666 A | 7/1998 | Tanase |
| 5,808,664 A | 9/1998 | Yamashita |
| 5,874,988 A | 2/1999 | Gu |
| 5,883,695 A | 3/1999 | Paul |
| 5,953,054 A | 9/1999 | Mercier |
| 5,963,247 A | 10/1999 | Banitt |
| 5,991,551 A | 11/1999 | Bacs, Jr. |
| 6,018,349 A | 1/2000 | Szeliski |
| 6,023,588 A | 2/2000 | Ray |
| 6,031,538 A | 2/2000 | Chupeau |
| 6,047,078 A | 4/2000 | Kang |
| 6,064,759 A | 5/2000 | Buckley |
| 6,075,905 A | 6/2000 | Herman |
| 6,094,215 A | 7/2000 | Sundahl |
| 6,215,516 B1 | 4/2001 | Ma |
| 6,215,899 B1 | 4/2001 | Morimura et al. |
| 6,240,198 B1 | 5/2001 | Rehg |
| 6,246,412 B1 | 6/2001 | Shum |
| 6,269,172 B1 | 7/2001 | Rehg |
| 6,269,175 B1 * | 7/2001 | Hanna .................. G06T 5/50 382/107 |
| 6,278,460 B1 | 8/2001 | Myers |
| 6,314,211 B1 | 11/2001 | Kim |
| 6,324,347 B1 | 11/2001 | Bacs, Jr. |
| 6,381,302 B1 | 4/2002 | Berestov |
| 6,384,859 B1 | 5/2002 | Matsumoto |
| 6,385,334 B1 | 5/2002 | Saneyoshi |
| 6,414,709 B1 | 7/2002 | Palm |
| 6,434,278 B1 | 8/2002 | Hashimoto |
| 6,445,833 B1 | 9/2002 | Murata |
| 6,496,598 B1 | 12/2002 | Harman |
| 6,512,892 B1 | 1/2003 | Montgomery |
| 6,556,704 B1 | 4/2003 | Chen |
| 6,559,846 B1 | 5/2003 | Uyttendaele |
| 6,611,268 B1 | 8/2003 | Szeliski |
| 6,611,664 B2 * | 8/2003 | Kochi ................... G03B 35/00 396/324 |
| 6,661,913 B1 | 12/2003 | Zhang |
| 6,677,981 B1 | 1/2004 | Mancuso |
| 6,677,982 B1 | 1/2004 | Chen |
| 6,686,926 B1 | 2/2004 | Kaye |
| 6,747,610 B1 | 6/2004 | Taima |
| 6,750,904 B1 | 6/2004 | Lambert |
| 6,760,488 B1 | 7/2004 | Moura |
| 6,798,406 B1 | 9/2004 | Jones |
| 6,847,392 B1 * | 1/2005 | House .................. H04N 13/25 348/36 |
| 6,862,364 B1 | 3/2005 | Berestov |
| 6,927,769 B2 | 8/2005 | Roche, Jr. |
| 6,947,059 B2 | 9/2005 | Pierce |
| 6,967,659 B1 | 11/2005 | Jayavant |
| 6,970,591 B1 | 11/2005 | Lyons |
| 6,978,051 B2 | 12/2005 | Edwards |
| 7,027,642 B2 | 4/2006 | Rubbert |
| 7,046,840 B2 | 5/2006 | Chang |
| 7,054,478 B2 | 5/2006 | Harman |
| 7,068,275 B2 | 6/2006 | Nakamura |
| 7,081,892 B2 | 7/2006 | Alkouh |
| 7,103,213 B2 | 9/2006 | Hirvonen |
| 7,108,657 B2 | 9/2006 | Irion |
| 7,113,632 B2 * | 9/2006 | Lee ...................... H04N 13/122 382/154 |
| 7,116,323 B2 | 10/2006 | Kaye |
| 7,116,324 B2 | 10/2006 | Kaye |
| 7,126,598 B2 | 10/2006 | Oh |
| 7,164,790 B2 | 1/2007 | Zhang |
| 7,180,536 B2 | 2/2007 | Wolowelsky |
| 7,181,061 B2 | 2/2007 | Kawano |
| 7,196,730 B2 | 3/2007 | Mihelcic |
| 7,197,192 B2 | 3/2007 | Edwards |
| 7,203,356 B2 | 4/2007 | Gokturk |
| 7,215,809 B2 | 5/2007 | Sato |
| 7,218,757 B2 | 5/2007 | Franz |
| 7,224,357 B2 | 5/2007 | Chen |
| 7,224,382 B2 | 5/2007 | Baker |
| 7,245,768 B1 | 7/2007 | Harman |
| 7,260,243 B2 | 8/2007 | Shibayama |
| 7,321,374 B2 | 1/2008 | Naske |
| 7,349,006 B2 | 3/2008 | Sato |
| 7,373,017 B2 | 5/2008 | Edwards |
| 7,397,481 B2 | 7/2008 | Endo |
| 7,400,782 B2 | 7/2008 | Zhou |
| 7,409,105 B2 | 8/2008 | Jin |
| 7,466,336 B2 | 12/2008 | Regan |
| 7,483,590 B2 | 1/2009 | Nielsen |
| 7,489,812 B2 | 2/2009 | Fox |
| 7,508,977 B2 | 3/2009 | Lyons |
| 7,512,883 B2 | 3/2009 | Wallick |
| 7,515,759 B2 | 4/2009 | Sun |
| 7,538,876 B2 | 5/2009 | Hewitt |
| 7,551,770 B2 | 6/2009 | Harman |
| 7,557,824 B2 | 7/2009 | Holliman |
| 7,573,475 B2 | 8/2009 | Sullivan |
| 7,573,489 B2 | 8/2009 | Davidson |
| 7,580,463 B2 | 8/2009 | Routhier |
| 7,605,776 B2 | 10/2009 | Satoh |
| 7,616,886 B2 | 11/2009 | Matsumura |
| 7,619,656 B2 | 11/2009 | Ben-Ezra |
| 7,639,838 B2 | 12/2009 | Nims |
| 7,643,062 B2 | 1/2010 | Silverstein |
| 7,680,323 B1 | 3/2010 | Nichani |
| 7,693,221 B2 | 4/2010 | Routhier |
| 7,701,506 B2 | 4/2010 | Silverbrook |
| 7,705,970 B2 | 4/2010 | Piestun |
| 7,711,181 B2 | 5/2010 | Kee |
| 7,711,201 B2 | 5/2010 | Wong |

(56) References Cited

U.S. PATENT DOCUMENTS

| | | | |
|---|---|---|---|
| 7,711,221 B2 | 5/2010 | Burgi | |
| 7,768,702 B2 | 8/2010 | Hirose | |
| 7,817,187 B2 | 10/2010 | Silsby | |
| 7,844,001 B2 | 11/2010 | Routhier | |
| 7,857,455 B2 | 12/2010 | Cowen | |
| 7,873,207 B2 | 1/2011 | Tsubaki | |
| 7,876,948 B2 | 1/2011 | Wetzel | |
| 8,274,552 B2 | 9/2012 | Dahi et al. | |
| 8,436,893 B2 | 5/2013 | McNamer et al. | |
| 8,441,520 B2 | 5/2013 | Dahi et al. | |
| 8,508,580 B2 | 8/2013 | McNamer et al. | |
| 8,810,635 B2 | 8/2014 | McNamer et al. | |
| 9,344,701 B2 | 5/2016 | Markas et al. | |
| 10,200,671 B2 | 2/2019 | Dahi et al. | |
| 2001/0036307 A1 | 11/2001 | Hanna et al. | |
| 2002/0106120 A1 | 8/2002 | Brandenburg | |
| 2002/0118019 A1* | 8/2002 | Nomura | H04N 1/00167 324/509 |
| 2002/0158873 A1 | 10/2002 | Williamson | |
| 2002/0190991 A1 | 12/2002 | Efran | |
| 2002/0191841 A1 | 12/2002 | Harman | |
| 2003/0002870 A1 | 1/2003 | Baron | |
| 2003/0030636 A1 | 2/2003 | Yamaoka | |
| 2003/0151659 A1 | 8/2003 | Kawano | |
| 2003/0152264 A1 | 8/2003 | Perkins | |
| 2004/0100565 A1 | 5/2004 | Chen | |
| 2004/0136571 A1 | 7/2004 | Hewitson | |
| 2004/0218269 A1 | 11/2004 | Divelbiss | |
| 2005/0041123 A1 | 2/2005 | Ansari | |
| 2005/0100192 A1 | 5/2005 | Fujimura et al. | |
| 2005/0201612 A1 | 9/2005 | Park et al. | |
| 2006/0008268 A1 | 1/2006 | Suwa | |
| 2006/0066728 A1* | 3/2006 | Batur | H04N 5/144 348/208.99 |
| 2006/0153450 A1* | 7/2006 | Woodfill | G06K 9/00973 382/173 |
| 2006/0159178 A1* | 7/2006 | Peng | H04N 5/23258 375/240.16 |
| 2006/0203335 A1 | 9/2006 | Martin | |
| 2006/0210111 A1 | 9/2006 | Cleveland | |
| 2006/0221072 A1 | 10/2006 | Se et al. | |
| 2006/0221179 A1 | 10/2006 | Seo | |
| 2006/0222260 A1 | 10/2006 | Sambongi | |
| 2007/0024614 A1 | 2/2007 | Tam | |
| 2007/0047040 A1 | 3/2007 | Ha | |
| 2007/0064098 A1 | 3/2007 | Tran | |
| 2007/0146232 A1 | 6/2007 | Redert | |
| 2007/0165129 A1 | 7/2007 | Hill | |
| 2007/0165942 A1 | 7/2007 | Jin | |
| 2007/0168820 A1 | 7/2007 | Kutz | |
| 2007/0189721 A1 | 8/2007 | Ryu et al. | |
| 2007/0189747 A1 | 8/2007 | Ujisato | |
| 2007/0291143 A1 | 12/2007 | Barbieri | |
| 2008/0004073 A1 | 1/2008 | John et al. | |
| 2008/0024614 A1 | 1/2008 | Li et al. | |
| 2008/0030592 A1 | 2/2008 | Border et al. | |
| 2008/0031327 A1 | 2/2008 | Wang | |
| 2008/0056609 A1 | 3/2008 | Rouge | |
| 2008/0062254 A1 | 3/2008 | Edwards | |
| 2008/0080852 A1 | 4/2008 | Chen | |
| 2008/0095402 A1* | 4/2008 | Kochi | G06T 7/248 382/103 |
| 2008/0117280 A1 | 5/2008 | Schowengerdt | |
| 2008/0117289 A1 | 5/2008 | Schowengerdt | |
| 2008/0150945 A1 | 6/2008 | Wang | |
| 2008/0158345 A1 | 7/2008 | Schklair | |
| 2008/0180550 A1 | 7/2008 | Gulliksson | |
| 2008/0218612 A1* | 9/2008 | Border | H04N 13/239 348/262 |
| 2008/0240607 A1 | 10/2008 | Sun | |
| 2008/0252725 A1 | 10/2008 | Lanfermann | |
| 2008/0317379 A1 | 12/2008 | Steinberg | |
| 2009/0061381 A1 | 3/2009 | Durbin | |
| 2009/0073164 A1 | 3/2009 | Wells | |
| 2009/0080036 A1 | 3/2009 | Paterson | |
| 2009/0116732 A1 | 5/2009 | Zhou | |
| 2009/0141967 A1 | 6/2009 | Hiroshi | |
| 2009/0154793 A1 | 6/2009 | Shin | |
| 2009/0154823 A1 | 6/2009 | Ben-ezra | |
| 2009/0167930 A1 | 7/2009 | Safaee-Rad et al. | |
| 2009/0169102 A1 | 7/2009 | Zhang et al. | |
| 2009/0169122 A1* | 7/2009 | He | H04N 5/2356 382/238 |
| 2009/0225199 A1* | 9/2009 | Ferren | H04N 5/23222 348/240.99 |
| 2009/0290013 A1 | 11/2009 | Hayashi | |
| 2009/0290037 A1 | 11/2009 | Pore | |
| 2009/0295907 A1 | 12/2009 | Kim | |
| 2010/0030502 A1 | 2/2010 | Higgins | |
| 2010/0039502 A1 | 2/2010 | Higgins | |
| 2010/0080417 A1* | 4/2010 | Qureshi | A61B 34/20 382/103 |
| 2010/0080448 A1 | 4/2010 | Tam et al. | |
| 2010/0097444 A1 | 4/2010 | Lablans | |
| 2010/0128109 A1 | 5/2010 | Banks | |
| 2010/0134598 A1 | 6/2010 | St-Pierre | |
| 2010/0134652 A1 | 6/2010 | Takane | |
| 2010/0142824 A1 | 6/2010 | Lu | |
| 2010/0165152 A1 | 7/2010 | Lim | |
| 2010/0182406 A1 | 7/2010 | Benitez | |
| 2010/0182484 A1 | 7/2010 | Iijima et al. | |
| 2010/0194902 A1 | 8/2010 | Lin et al. | |
| 2010/0201682 A1 | 8/2010 | Quan et al. | |
| 2010/0208942 A1 | 8/2010 | Porter | |
| 2010/0220932 A1 | 9/2010 | Dong-Qing et al. | |
| 2010/0238327 A1 | 9/2010 | Griffith | |
| 2010/0239158 A1 | 9/2010 | Rouge | |
| 2010/0283868 A1* | 11/2010 | Clark | H04N 5/232125 348/231.4 |
| 2010/0295927 A1 | 11/2010 | Turner et al. | |
| 2010/0309286 A1 | 12/2010 | Chen | |
| 2010/0309288 A1 | 12/2010 | Stettner | |
| 2010/0309292 A1 | 12/2010 | Ho et al. | |
| 2011/0018975 A1 | 1/2011 | Chen | |
| 2011/0025825 A1 | 2/2011 | McNamer | |
| 2011/0025829 A1 | 2/2011 | McNamer | |
| 2011/0025830 A1* | 2/2011 | McNamer | H04N 13/211 348/50 |
| 2011/0050853 A1 | 3/2011 | Zhang | |
| 2011/0050859 A1 | 3/2011 | Kimmel | |
| 2011/0050864 A1 | 3/2011 | Bond | |
| 2011/0109720 A1 | 5/2011 | Smolic et al. | |
| 2011/0169921 A1 | 7/2011 | Lee et al. | |
| 2011/0169985 A1* | 7/2011 | Cooper | G06T 3/4038 348/241 |
| 2011/0228051 A1 | 9/2011 | Dedeoglu et al. | |
| 2011/0255775 A1 | 10/2011 | McNamer | |
| 2012/0013757 A1* | 1/2012 | Beckers | G03B 35/06 348/222.1 |
| 2012/0105602 A1 | 5/2012 | McNamer | |
| 2012/0162374 A1 | 6/2012 | Markas et al. | |
| 2012/0162379 A1 | 6/2012 | Dahi et al. | |
| 2012/0314036 A1 | 12/2012 | Dahi et al. | |
| 2013/0111464 A1 | 5/2013 | Markas et al. | |
| 2013/0114894 A1 | 5/2013 | Yadav et al. | |
| 2013/0135445 A1 | 5/2013 | Dahi | |
| 2013/0242059 A1 | 9/2013 | Dahi et al. | |
| 2014/0009462 A1 | 1/2014 | McNamer et al. | |

FOREIGN PATENT DOCUMENTS

| | | |
|---|---|---|
| GB | 2405764 | 3/2005 |
| GB | 2455316 | 6/2009 |
| JP | 2002524937 A | 8/2002 |
| JP | 2005210217 A | 8/2005 |
| JP | 2008172523 A | 7/2008 |
| JP | 2010230879 A | 10/2010 |
| JP | 2010252186 A | 11/2010 |
| KR | 100653965 B1 | 11/2006 |
| KR | 10-0653965 B1 | 12/2006 |
| WO | 9615631 A1 | 5/1996 |
| WO | 2005025239 A1 | 3/2005 |

(56) References Cited

FOREIGN PATENT DOCUMENTS

| WO | 2006/062325 | A1 | 6/2006 |
|---|---|---|---|
| WO | 2006062325 | A1 | 6/2006 |
| WO | 2008/016882 | A2 | 2/2008 |
| WO | 2008016882 | A2 | 2/2008 |
| WO | 2008075276 | A1 | 6/2008 |
| WO | 20080075276 | A1 | 6/2008 |
| WO | 2009/122200 | A1 | 10/2009 |
| WO | 2010024479 | A1 | 3/2010 |
| WO | 2010052741 | A1 | 5/2010 |
| WO | 2010147609 | A1 | 12/2010 |
| WO | 2011/014419 | A | 2/2011 |
| WO | 2011/014420 | A1 | 2/2011 |
| WO | 2011/014421 | A2 | 2/2011 |
| WO | 2011014419 | A1 | 2/2011 |
| WO | 2011014420 | A1 | 2/2011 |
| WO | 2011017308 | A1 | 2/2011 |
| WO | 2012061549 | A1 | 5/2012 |
| WO | 2012061549 | A2 | 5/2012 |
| WO | 2012091878 | A2 | 7/2012 |
| WO | 2012092246 | A2 | 7/2012 |
| WO | 2013158784 | A1 | 10/2013 |

OTHER PUBLICATIONS

Preliminary Amendment filed in related U.S. Appl. No. 13/584,744 dated Jan. 14, 2013. (7 pages).
Terminal Disclaimer filed in related U.S. Appl. No. 13/584,744 dated Mar. 12, 2013. (2 pages).
Approval of Terminal Disclaimer in related U.S. Appl. No. 13/584,744 dated Mar. 14, 2013. (1 page).
Notice of Allowance issued in related U.S. Appl. No. 13/751,203 dated Sep. 20, 2018. (14 pages).
Response to Office Action in related U.S. Appl. No. 13/751,203 dated Jul. 25, 2018. (10 pages).
Request for Continued Examination Transmittal in related U.S. Appl. No. 13/751,203 dated Dec. 23, 2016. (3 pages).
Non-final Office Action in related U.S. Appl. No. 13/751,203 dated Apr. 7, 2017. (12 pages).
Non-final Office Action in related U.S. Appl. No. 13/751,203 dated Oct. 7, 2015. (10 pages).
Office Action Response in related U.S. Appl. No. 13/751,203 dated Dec. 23, 2016. (9 pages).
Final Office Action in related U.S. Appl. No. 13/751,203 dated Jun. 23, 2016. (13 pages).
Final Office Action in related U.S. Appl. No. 13/751,203 dated Jan. 25, 2018. (14 pages).
Response to Office Action in related U.S. Appl. No. 13/751,203 dated Oct. 10, 2017. (10 pages).
Request for Continued Examination Transmittal in related U.S. Appl. No. 13/751,203 dated Jul. 25, 2018. (3 pages).
Response to Office Action in related U.S. Appl. No. 13/751,203 dated Apr. 7, 2016. (11 pages).
Search Report and Written Opinion for related PCT International Patent Application No. PCT/USI0/43022 dated Nov. 16, 2010. (15 pages).
Search Report and Written Opinion for related PCT International Patent Application No. PCT/USI0/43023 dated Oct. 13, 2010. (11 pages).
Search Report and Written Opinion for related PCT International Patent Application No. PCT/US20I0/043025 dated Feb. 9, 2012. (10 pages).
International Search Report and Written Opinion issued in counterpart PCT Application No. PCT/US2011/064050 dated Jul. 18, 2012. (9 pages).
Examiner Interview dated Oct. 11, 2011 in related U.S. Appl. No. 13/115,589. (3 pages).
Applicant's response filed in related U.S. Appl. No. 13/115,589 dated Nov. 9, 2011. (11 pages).
Final Office Action issued in counterpart U.S. Appl. No. 13/115,589 dated Dec. 2, 2011. (13 pages).

Amendment After Final Office Action by Applicant in related U.S. Appl. No. 13/115,589 dated Jan. 2, 2012. (11 pages).
Applicant Initiated Interview summary dated Jan. 10, 2012 in related U.S. Appl. No. 13/115,589. (3 pages).
Advisory Action issued in counterpart U.S. Appl. No. 13/115,589 dated Jan. 12, 2012. (3 pages).
Applicant's Request for Continued Examination filed Jan. 20, 2012 in related U.S. Appl. No. 13/115,589. (3 pages).
Written Opinion/Search Report for PCT International Patent Application No. PCT/US11/59057 dated May 23, 2012. (3 pages).
Chen, Shu-Ching et al., Video Scene Change Detection Method Using Unsupervised Segmentation and Object Tracking, IEEE International Conference on Multimedia and Expo (CME), pp. 57-60, 2001. (4 pages).
Nöll, Tobias et al., Markerless Camera Pose Estimation—An Overview, Visualization of Large and Unstructured Data Sets—IRTG Workshop, pp. 45-54, 2010. (10 pages).
Chen, Shenchang Eric et al., View Interpolation for Image Synthesis, Proceedings of ACM SIGGRAPH, pp. 279-288, 1993 (7 pages).
McMillan, Jr., Leonard, An Image-Based Approach to Three-Dimensional Computer Graphics, PhD. Dissertation submitted to the University of North Carolina at Chapel Hill, Apr. 1997 (206 pages).
Written Opinion for related PCT Application Serial PCT/ US13/ 37010 dated Aug. 27, 2013. (4 pages).
Int'l Search Report and Written Opinion for related application PCT/US2011/067349 dated Sep. 7, 2012 (9 pages).
Notice of Allowance for related U.S. Appl. No. 12/842,171 dated Mar. 26, 2013. (34 pages).
Mahajan et al., "Moving Gradients: A Path-Based Method for Plausible Image Interpolation", Proceedings of ACM SIGGRAPH 2009, vol. 28, Issue 3 (Aug. 2009). (10 pages).
Notice of Allowance issued in counterpart U.S. Appl. No. 13/584,744 dated Apr. 9, 2013. (10 pages).
Int'l Preliminary Report on Patentability and Written Opinion for related application No. PCT/US2011/059057 dated May 21, 2012. (4 pages).
Joly, Phillippe et al., Efficient automatic analysis of camera work and microsegmentation of video using spatiotemporal images, 1996, Signal Process Image Communication, pp. 295-307. (13 pages).
Krotkov, Eric et al., An Agile Stereo Camera System for Flexible Image Acquisition, 1988, IEEE, vol. 4, pp. 108-113. (6 pages).
U.S. Non-Final Office Action for related U.S. Appl. No. 12/842,084 dated Oct. 26, 2012. (28 pages).
U.S. Non-Final Office Action for related U.S. Appl. No. 12/842,171 dated Nov. 26, 2012. (71 pages).
Applicant-Initiated Interview Summary issued in counterpart U.S. Appl. No. 12/842,084 dated Jan. 30, 2013. (6 pages).
Applicant-Initiated Interview Summary issued in counterpart U.S. Appl. No. 12/842,171 dated Feb. 8, 2013. (4 pages).
Applicant's Response to U.S. Non-Final Office Action for related U.S. Appl. No. 12/842,084 dated Jan. 28, 2013. (12 pages).
Chinese-language Office Action issued in counterpart CN Application No. 201180065036.2 dated Dec. 12, 2015 with English translation (thirteen (13) pages).
Final Office Action issued in counterpart U.S. Appl. No. 12/842,257 dated Oct. 7, 2014. (29 pages).
Final Office Action issued in counterpart U.S. Appl. No. 12/842,257 dated Sep. 9, 2013. (27 pages).
Final Office Action issued in counterpart U.S. Appl. No. 13/888,737 dated Dec. 22, 2014. (9 pages).
Final Office Action issued in counterpart U.S. Appl. No. 13/888,737 dated Jan. 4, 2016. (12 pages).
International Search Report in related PCT Application No. PCT/ US2011/59057 dated May 21, 2012. (8 pages).
Non-Final Office Action issued in counterpart U.S. Appl. No. 12/842,257 dated Apr. 10, 2014. (27 pages).
Non-Final Office Action issued in counterpart U.S. Appl. No. 12/842,257 dated Dec. 5, 2012. (67 pages).
Non-Final Office Action issued in counterpart U.S. Appl. No. 13/115,589 dated Oct. 11, 2011. (81 pages).
Non-Final Office Action issued in counterpart U.S. Appl. No. 13/888,737 dated Apr. 9, 2015. (13 pages).

(56) References Cited

OTHER PUBLICATIONS

Non-Final Office Action issued in counterpart U.S. Appl. No. 13/888,737 dated Feb. 10, 2014. (8 pages).
Notice of Allowance issued in counterpart U.S. Appl. No. 13/115,589 dated Jun. 14, 2012. (12 pages).
Notice of Allowance issued in counterpart U.S. Appl. No. 13/115,589 dated Aug. 6, 2012. (4 pages).
Restriction Requirement issued in counterpart U.S. Appl. No. 13/888,737 dated Sep. 4, 2014. (6 pages).
Japanese-language Office Action issued in counterpart JP Application No. 2013-547504 dated Dec. 1, 2015 (nine (9) pages).
Notification of Application Deemed to be Withdrawn in Chinese application No. 201180065036.2 dated Sep. 7, 2015 with English translation. (2 pages).
Translation of Filing Receipt issued in related Chinese application No. 201180065036.2 dated Aug. 6, 2013. (1 page).
Notice of invention patent application published and entered a substantive examination phase in related Chinese application No. 201180065036.2 dated Oct. 9, 2013 (2 pages).
Decision of Refusal in related Japanese application No. 2013-547504 dated Apr. 26, 2016. (1 page).
International Preliminary Report on Patentability issued in related PCT Application No. PCTUS2011/064050 dated Jul. 2, 2013. (5 pages).
Applicant-Initiated Interview Summary in related U.S. Appl. No. 13/888,737 dated Apr. 27, 2015. (3 pages).
Request for Continued Examination in related U.S. Appl. No. 13/888,737 dated Mar. 23, 2015. (3 pages).
Response to Office Action in related U.S. Appl. No. 13/888,737 dated May 12, 2014. (8 pages).
Amendment After Final Office Action by Applicant in related U.S. Appl. No. 13/888,737 dated Mar. 23, 2015. (10 pages).
Response to Election/Restrictions in related U.S. Appl. No. 13/888,737 dated Sep. 7, 2014. (3 pages).
Notice of Abandonment in related U.S. Appl. No. 13/888,737 dated Jul. 28, 2016. (3 pages).
Amendment After Non-Final Office Action by Applicant in related U.S. Appl. No. 13/888,737 dated Oct. 9, 2015. (14 pages).

* cited by examiner

PRIMARY AND AUXILIARY IMAGE CAPTURE DEVICES FOR IMAGE PROCESSING AND RELATED METHODS

CROSS REFERENCE TO RELATED APPLICATIONS

This application is continuation of U.S. patent application Ser. No. 16/261,513, filed on Jan. 29, 2019, which is a continuation of U.S. patent application Ser. No. 13/751,203, filed on Jan. 28, 2013, which is a continuation-in-part of U.S. patent application Ser. No. 13/584,744, filed Aug. 13, 2012, which claims the benefit of U.S. patent application Ser. No. 13/115,589, filed May 25, 2011; which claims the benefit of U.S. Provisional Patent Application Ser. No. 61/427,278, filed Dec. 27, 2010, the contents of all of which are hereby incorporated by reference in their entireties.

TECHNICAL FIELD

The subject matter disclosed herein relates to image processing. In particular, the subject matter disclosed herein relates to primary and auxiliary capture devices for image processing and related methods.

BACKGROUND

Stereoscopic, or three-dimensional, imagery is based on the principle of human vision. Two separate detectors detect the same object or objects in a scene from slightly different positions and/or angles and project them onto two planes. The resulting images are transferred to a processor which combines them and gives the perception of the third dimension, i.e. depth, to a scene.

Many techniques of viewing stereoscopic images have been developed and include the use of colored or polarizing filters to separate the two images, temporal selection by successive transmission of images using a shutter arrangement, or physical separation of the images in the viewer and projecting them separately to each eye. In addition, display devices have been developed recently that are well-suited for displaying stereoscopic images. For example, such display devices include digital still cameras, personal computers, digital picture frames, set-top boxes, high-definition televisions (HDTVs), and the like.

The use of digital image capture devices, such as digital still cameras, digital camcorders (or video cameras), and phones with built-in cameras, for use in capturing digital images has become widespread and popular. Because images captured using these devices are in a digital format, the images can be easily distributed and edited. For example, the digital images can be easily distributed over networks, such as the Internet. In addition, the digital images can be edited by use of suitable software on the image capture device or a personal computer.

Digital images captured using conventional image capture devices are two-dimensional. It is desirable to provide methods and systems for using conventional devices for generating three-dimensional images. In addition, it is desirable to provide systems for providing improved techniques for processing images for generating three-dimensional images or two-dimensional images.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are primary and auxiliary image capture devices for image processing and related methods. According to an aspect, a method may include using primary and auxiliary image capture devices, each including an image sensor and a lens, to perform image processing. The method may include using the primary image capture device to capture a first image of a scene, the first image having a first quality characteristic. Further, the method may include using the auxiliary image capture device to capture a second image of the scene. The second image may have a second quality characteristic. The second quality characteristic may be of lower quality than the first quality characteristic. The method may also include adjusting at least one parameter of one of the captured images to create a plurality of adjusted images for one of approximating and matching the first quality characteristic. Further, the method may include utilizing the adjusted images for image processing.

According to another aspect, a method may include using primary and auxiliary image capture devices to generate a still image without blurring. The method may include using the primary image capture device to capture a first image of a scene. Further, the method may include using the auxiliary image capture device to capture a plurality of other images of the scene. The method may also include determining a motion blur kernel based on the plurality of other images. Further, the method may include applying the motion blur kernel to remove blur from the first image of the scene.

According to another aspect, a system may include a computing device including a primary image capture device and an external device interface. The system may also include an attachable, computing device accessory including an auxiliary image capture device and a connector configured for operable attachment to the external device interface. The accessory may be configured to communicate captured images to the computing device via the connector and external device interface.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1:
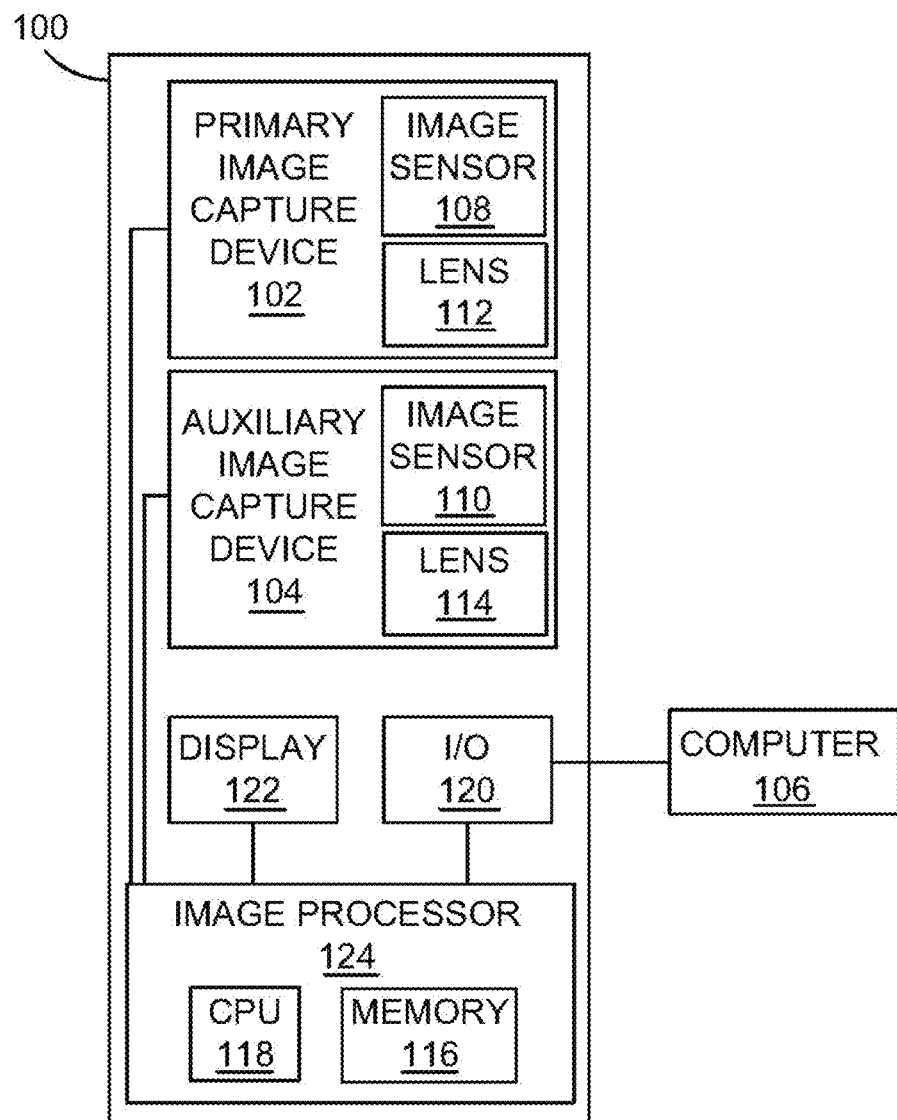
FIG. 1 is a block diagram of an exemplary image capture system including a primary image capture device an auxiliary image capture device for use in capturing images of a scene and performing image processing according to embodiments of the presently disclosed subject matter.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In accordance with embodiments of the presently disclosed subject matter, primary and auxiliary image capture devices for image processing and related methods are disclosed herein. Each of the primary and auxiliary image capture devices includes an image sensor and a lens. In an example use, the primary image capture device captures an image of a scene. The captured image may have a first quality characteristic, which may include a particular resolution, particular sensor size and/or pixel pitch, particular view angle and focal length, particular color accuracy, particular lens distortion characteristic, and the like. The auxiliary image capture device captures another image of the scene. This other captured image may have a quality characteristic that is of lower quality in at least one aspect than is the quality characteristic of the image captured by the primary image capture device. One or more parameters of one or both of the captured images may be adjusted to create multiple adjusted images for approximating or matching the quality characteristic of the image captured by the primary image capture device. For example, one or more of a cropping factor, size, focal length, and scaling of one or both of the images may be adjusted to match a resolution and/or approximate a field of view of the images. In another example, the distortion characteristics of at least one of the capture devices can be calculated and a transformative procedure can be applied to the image data captured from that device to align it with the image data from the other sensor. In another example, a color of one image can be adjusted to match or approximate a color of the other image. The adjusted images may be used for image processing. In an example use, one or more stereoscopic still images or video sequences may be generated by performing a registration or a rectification process based on the captured images and the adjusted images. In another example, data obtained from the auxiliary and primary capture devices, such as, but not limited, to disparity map, can be used to recreate a new view using data from the main capture device using a depth image based rendering technique (DIBR) to create a stereoscopic pair of images.

In other embodiments of the presently disclosed subject matter, primary and auxiliary capture devices may be used to calculate the proper stereo base when creating stereoscopic images by taking two pictures side-by-side. The disparity data calculated by both captured images can be used to calculate the ideal stereo base to make a stereoscopic image with comfortable viewing attributes. Under the same embodiment, the live data of the captured devices can be used to determine the proper positioning of the main capture device to take the second picture.

In other embodiment of the presently disclosed subject matter, the disparity map calculated using the auxiliary and main images can be scaled up or down to create a different stereoscopic representation compared to the one generated from the true separation of the two captured devices. This is particularly useful in cases where the ideal stereo base is either larger or smaller to the stereo base provided by the fixed separation of the two captured devices.

In other embodiment of the presently disclosed subject matter, the disparity map calculated using the primary and auxiliary images may be used to identify objects with large or infinite disparity as a result of either moving objects or objects that are too close or too far away for comfortable viewing. In such cases, objects with large disparity can be moved from one image to another image, or can be moved within the same image, or can be removed from one image or both images to correct for such large disparity. Unfilled areas resulting from the movement or removal of objects, can be filled using image data from the other image or interpolated using data from the same image.

In other embodiments of the presently disclosed subject matter, primary and auxiliary image capture devices may be used to generate still images without blurring. In many situations, conventional cameras are limited in their ability to capture high speed motion obtain while maintaining proper exposure. ISO gain can only increase to a certain amount without significant noise, and as such, the necessary shutter speed may be impossible to achieve. This may result in image blurring at high motion. The presently disclosed subject matter, when implemented using a high speed auxiliary camera system, provides a means of reducing and/or removing this blur. For example, a primary image capture device may be used to capture an image of a scene. An auxiliary image capture device may be used to capture multiple other images of the scene. Further, a motion blur kernel may be determined based on the multiple other images. The motion blur kernel may then be applied to remove blur from the first image of the scene.

In other embodiments of the presently disclosed subject matter, primary and auxiliary image capture devices may be used to generate a video sequence without handshaking. For example, a primary image capture device may be used to capture a sequence of images of a scene. An auxiliary image capture device may be used to capture another sequence of images of the scene. Next, a disparity map is generated. Further, an object having the same disparity between two successive images in the sequences may be determined. In response to determining that the object has the same disparity, the object is identified as a non-moving object. Next, a shaking motion vector for the non-moving object is calculated. The shaking in a video and/or still image of the scene generated based on the images may be compensated.

Stereoscopic, or three-dimensional, content is based on the principle of human vision. Two separate detectors detect the same object—or objects—in a plurality of images from slightly different angles and project them onto two planes. The plurality of images is then transferred to a processor which assigns the captured images as the one view (i.e., left or right eye), analyzes the individual images, possibly interpolates additional frames/frame views, and for each image generates a corresponding view for the other eye. Those two images or sequences are then combined to create stereoscopic (three dimensional) content. The resulting three-dimensional content can further be encoded using, but not limited, to one of the video encoding popular formats such as JPEG, MPEG, H.264, etc. The generated content can further be stored with audio to a digital media using one of popular containers such as .avi, .mpg, etc. In other embodiments of the presently disclosed subject matter, primary and auxiliary image capture devices may be used to generate a focus stacking image. The main captured device can be configured to capture an image on the desired focal distance, whereas the auxiliary sensor can be used to capture an image on a different focal distance. The data from the two captured devices can then be combined to create a focus stacking image.

Content captured using conventional image capture devices are often limited in their ability to reproduce the dynamic range of a scene. In certain scenes where very light and very dark objects coexist, it is impossible for typical image sensors to obtain the correct exposure across the image, and hence, impossible for the camera to reproduce what the user of the camera sees. The presently disclosed subject matter allows the two cameras in the system to properly adjust their exposure settings to capture the bright and dark areas separately to create a High-Dynamic-Range (HDR) image of the scene with balanced bright and dark areas.

Embodiments of the presently disclosed subject matter may be implemented on a camera or other image capture system including primary and auxiliary image capture devices. Each of the primary and auxiliary image capture devices may include an image sensor and one or more lenses. The camera may be implemented on a mobile device such as a mobile phone or smart phone. Further, embodiments of the presently disclosed subject matter may also be based on the technology that allows a user to capture a pair of two-dimensional video sequences, one from the primary image capture device of the camera and the other from the auxiliary image capture device for creating a three-dimensional video sequence. The functions disclosed herein can be implemented in hardware, software, and/or firmware that can be executed within, for example, but not limited to the proposed camera, a digital still camera, another type of video camera (or camcorder), a personal computer, a digital picture frame, a set-top box, an HDTV, a phone, or the like.

In an example, a portable capture device such as a cellphone, camera, or a tablet may include primary and auxiliary image capture devices according to embodiments of the present disclosure. The auxiliary image capture device may be attached to or otherwise integrated with the camera or cellphone for capturing one or more images of a scene. Data of the images captured by the auxiliary image capture device may be used together with data of one or more images captured by the primary image capture device for creating a three-dimensional image or video sequence. In an example attachment of the auxiliary image capture device, the auxiliary image capture device can be placed on a back of a rotatable LCD display housing such that when the LCD display housing is in an open position, the image plane of the auxiliary image capture device is parallel—or nearly parallel—to the image plane of the primary image capture device. On cellphones, the inwards facing camera that is primarily used for video conferencing applications, can be used as the auxiliary capture device by modifying its design and allowing it to either capture images from the person holding the cellphone or the scene with the same field of view as the main camera. The auxiliary image capture device and its lens can have a quality characteristic that is of lower quality than a quality characteristic of the primary image capture device and its lens. It is noted that the quality and the resolution of resulting three-dimensional image or video may depend directly on the quality and resolution of the primary image capture device and its lens and may not directly depend on the quality and resolution of the auxiliary image capture device and its lens. Such three-dimensional still pictures or video sequences can be viewed or displayed on a suitable stereoscopic display.

Method embodiments described herein can be implemented on a system capable of capturing still images or video sequences, displaying three-dimensional images or videos, and executing computer executable instructions on a processor. The device may be, for example, a digital still camera, a video camera (or camcorder), a personal computer, a digital picture frame, a set-top box, an HDTV, a phone, or the like. The functions of the device may include methods for selecting video segments, creating corresponding views for each image in the main video sequence, rectifying and registering at least two views, matching the color and edges of the views, performing stabilization of the sequence, calculating a sparse or dense depth map, synthesizing views, altering the perceived depth of objects, and any final display-specific transformation to create a single, high-quality three-dimensional video sequence.

FIG. 1 illustrates a block diagram of an exemplary image capture system 100 including a primary image capture device 102 and an auxiliary image capture device 104 for use in capturing images of a scene and performing image processing according to embodiments of the presently disclosed subject matter. In this example, the system 100 is a digital camera capable of capturing multiple consecutive, still digital images of a scene. The devices 102 and 104 may each capture multiple consecutive still digital image of the scene. In another example, the system 100 may be a video camera capable of capturing a video sequence including multiple still images of a scene. In this example, the devices 102 and 104 may each capture a video sequence including multiple still images of the scene. A user of the system 100 may position the system in different positions for capturing images of different perspective views of a scene. The captured images may be suitably stored and processed for generating three-dimensional images as described herein. For example, subsequent to capturing the images of the different perspective views of the scene, the system 100, alone or in combination with a computer such as computer 106, may use the images for generating a three-dimensional image of the scene and for displaying the three-dimensional image to the user.

Referring to FIG. 1, the primary and auxiliary image capture devices 102 and 104 may include image sensors 108 and 110, respectively. The image sensor 110 may be of a lesser quality than the image sensor 108. For example, the quality characteristics of images captured by use of the image sensor 110 may be of lower quality than the quality characteristics of images captured by use of the image sensor 108. The image sensors 108 and 110 may each include an array of charge coupled device (CCD) or CMOS sensors. The image sensors 108 and 110 may be exposed to a scene through lenses 112 and 114, respectively, and a respective exposure control mechanism. The lens 114 may be of lesser quality that the lens 112. The system 100 may also include analog and digital circuitry such as, but not limited to, a memory 116 for storing program instruction sequences that control the system 100, together with at least one CPU 118, in accordance with embodiments of the presently disclosed subject matter. The CPU 118 executes the program instruction sequences so as to cause the system 100 to expose the image sensors 108 and 110 to a scene and derive digital images corresponding to the scene. The digital image may be captured and stored in the memory 116. All or a portion of the memory 116 may be removable, so as to facilitate transfer of the digital image to other devices such as the computer 106. Further, the system 100 may be provided with an input/output (I/O) interface 120 so as to facilitate transfer of digital image even if the memory 116 is not removable. The system 100 may also include a display 122 controllable by the CPU 118 and operable to display the captured images in real-time for real-time viewing by a user.

Figure 2:
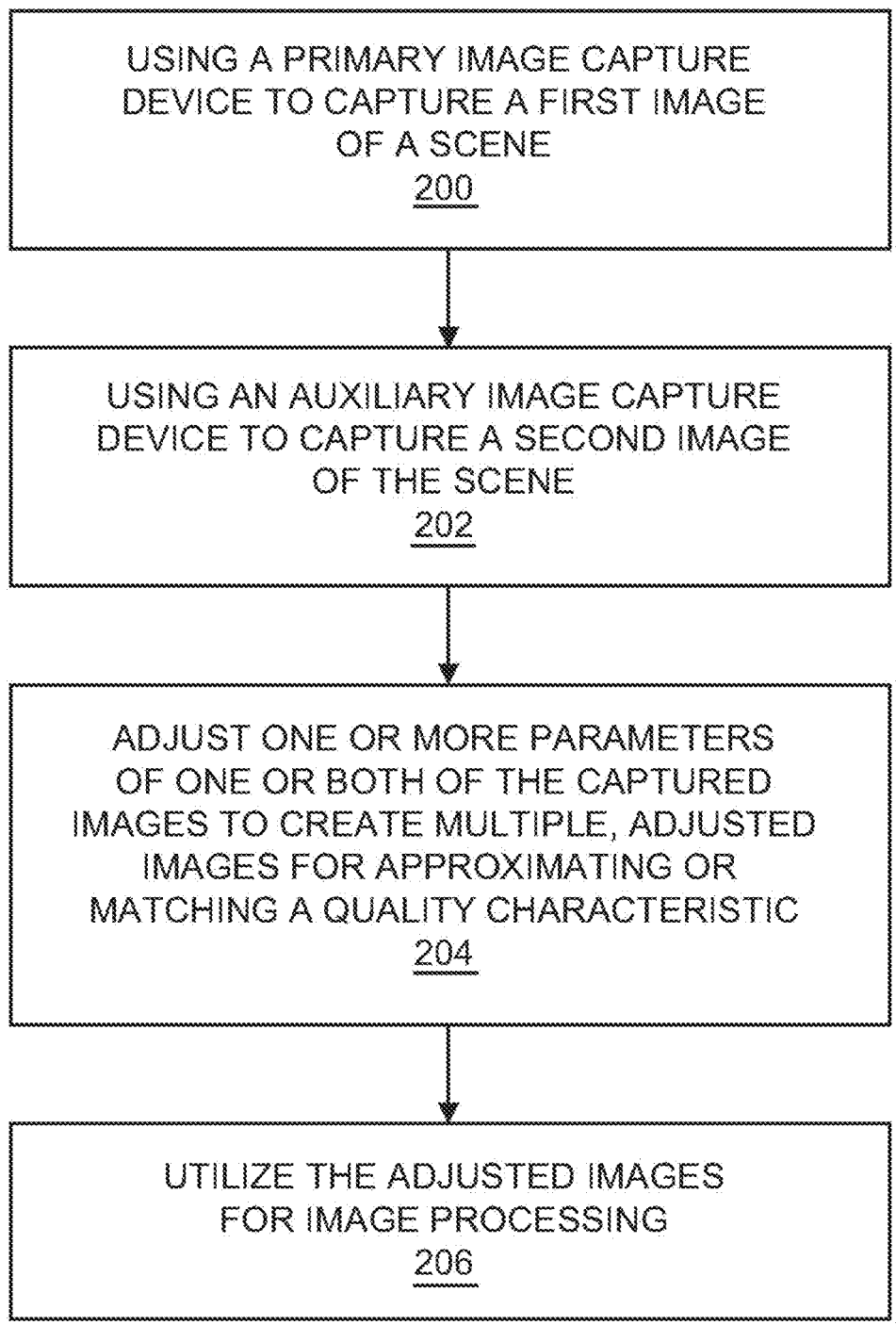
FIG. 2 is a flow chart of an exemplary method for performing image processing using the system shown in FIG. 1, alone or together with any other suitable device, in accordance with embodiments of the present disclosure.

The memory 116 and the CPU 118 may be operable together to implement an image processor 124 for performing image processing including generation of three-dimensional images in accordance with embodiments of the presently disclosed subject matter. The image processor 124 may control the primary image capture device 102 and the auxiliary image capture device 104 for capturing images of a scene. Further, the image processor 124 may further process the images and generate three-dimensional images as described herein. FIG. 2 illustrates a flow chart of an exemplary method for performing image processing using the system 100, alone or together with any other suitable device, in accordance with embodiments of the present disclosure. Referring to FIG. 2, the method includes using 200 a primary image capture device to capture a first image of a scene. For example, the image processor 124 shown in FIG. 1 may control the primary image capture device 102 to capture an image of a scene. The captured image may have a particular quality characteristic, which may include a particular resolution, particular sensor size and/or pixel pitch, particular view angle and focal length, particular color accuracy, particular lens distortion characteristic, and the like. The captured image may be one of multiple images captured by the primary image capture device 102. The different images can include images of the same or different perspective views of the scene. The CPU 106 may then implement instructions stored in the memory 104 for storing the captured images in the memory 104.

The method of FIG. 2 includes using 202 an auxiliary image capture device to capture another image of the scene. For example, the image processor 124 shown in FIG. 1 may control the auxiliary image capture device 104 to capture an image of a scene. The image captured by the auxiliary image capture device 104 may have a particular quality characteristic that is of lower quality than the quality characteristic of the image captured by the primary image capture device 102.

The method of FIG. 2 includes adjusting 204 one or more parameters of one or both of the captured images to create a multiple, adjusted images for approximating or matching a quality characteristic of the image captured by the primary image capture device 102. For example, the image processor 124 may adjust a cropping factor, size, scaling, the like, or combinations thereof of one or both of the images captured by the primary image capture device 102 and the auxiliary image capture device 104 such that a resolution of the captured images are matched. In another example, the image processor 124 may adjusting a cropping factor, size, scaling, the like, or combinations thereof of one or both of the images captured by the primary image capture device 102 and the auxiliary image capture device 104 such that a field of view of other captured images is approximated. In another example, the image processor 124 may adjust a color of one image to match or approximate a color of the other image.

The method of FIG. 2 includes utilizing 206 the adjusted images for image processing. The image processing functions may include any of registration, rectification, disparity calculation, stereo-base calculations, or depth-based rendering to generate stereoscopic images or video sequences, High-Dynamic-Range techniques to balance dark and bright areas or the scene, anti-blurring techniques to remove motion blurring, video stabilization techniques, and focus stacking functions.

Figure 3A:
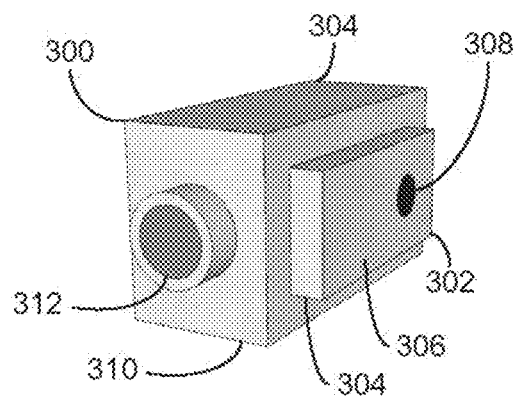
FIGS. 3A and 3B are perspective views of an example video camera including a primary image capture device and an auxiliary image capture device according to embodiments of the present disclosure.
Figure 3B:
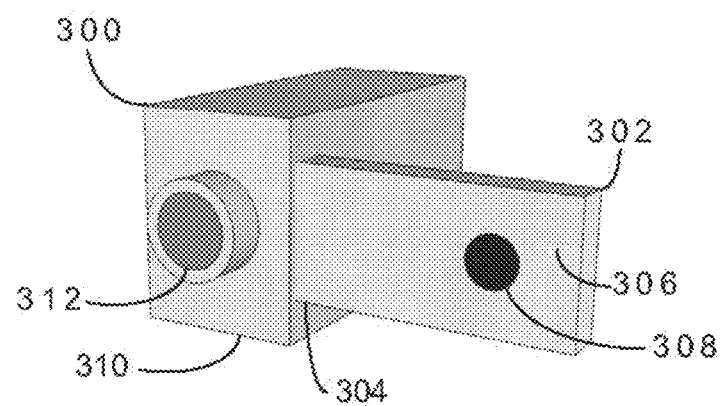

FIGS. 3A and 3B illustrates perspective views of an example video camera 300 including a primary image capture device and an auxiliary image capture device according to embodiments of the present disclosure. The video camera 300 includes a rotatable component 302 that can be positioned in a closed position as shown in FIG. 3A or an open position as shown in FIG. 3B. A user can manually rotate the component 302 along a hinge 304 for positioning the component 302 in either the open or closed positions. In this example, the component 304 includes an LCD display (not shown because it is located on an opposing side of the component 304). In the open position, the LCD display can be viewed by the user. On a facing side 306 of the component 304 (i.e., a side opposing the LCD display), the auxiliary image capture device 308 is positioned for capture of images in accordance with embodiments of the present disclosure.

In this example, a main body 310 of the video camera 300 includes the primary image capture device. The primary image capture device 312 may be positioned on a front portion of the main body 310. The captured devices 308 and 312 may be positioned such that the image planes of the primary and auxiliary image capture devices are parallel or nearly parallel to one another. A micro-switch or a magnetic switch can be placed between the rotatable portion 306 and the body 310 to inform the user when the portion 306 has reached the proper position for capturing 3D videos or other applications in accordance with embodiments of the present disclosure. This information can be displayed on the LCD screen, or by any other suitable technique such as turning on an indicator light such as an LED.

Figure 4:
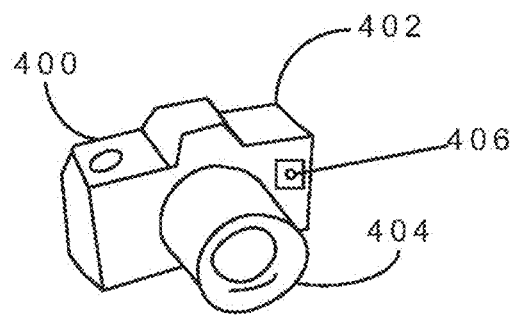
FIG. 4 is a perspective view of an example digital camera including a primary image capture device and an auxiliary image capture device according to embodiments of the present disclosure.

FIG. 4 illustrates a perspective view of an example digital camera 400 including a primary image capture device and an auxiliary image capture device according to embodiments of the present disclosure. Referring to FIG. 4, the camera 400 includes a main body 402 having a primary image capture device 404 and an auxiliary image capture device 406. Capture devices 404 and 406 may be located at any suitable position on the body 402.

In an embodiment, the resolution and the frame rate of the auxiliary image capture device may be the same as or equal to the resolution and the frame rate of the primary image capture device. In situations in which the frame rates of the sensors are different, piece-wise constant, linear, or other suitable techniques of interpolation between frames can be used to compensate for missing frames in a video sequence captured by the auxiliary image capture device. This may apply to both cases in which output of the auxiliary image capture device is a video stream, or a set of consecutive image captures at constant or variable frame rates.

In addition, the quality and focal length of the lens of the auxiliary image capture device, and its zooming capabilities if applicable, may be equal to those of the lens of the primary image capture device. There are however limitations on the optics relationship of the main and auxiliary cameras. At the shortest focal length of the main cameras zoom lens, the auxiliary camera may have the same angle of view, hence necessitating an equivalent focal length of the auxiliary camera equal to the widest focal length of the main zoom. Similarly, however, there are practical limits to the amount of digital zoom that can be accomplished while still being able to reasonably match data between the cameras, likely limiting the longest zoom focal length to somewhere between 4× and 8× the shortest focal length, although this is not a specific limitation of the design described herein. In cases in which the primary lens has zooming capabilities but the auxiliary lens does not, the image sensor of the auxiliary image capture device may have higher resolution than the image sensor of the primary image capture device. This greater resolution may allow for more accurate "digital zooming," the process of which is discussed in further detail herein below. It is noted that the optimal quality specifications for the sensors of the primary and auxiliary image capture devices should not be considered absolute requirements. In other words, the presently disclosed subject matter is not limited to the systems with optimal specifications described herein above.

In accordance with embodiments of the present disclosure, the distance between the sensors of the primary and auxiliary image capture devices and the angle between the two sensor planes can be constant or adaptive. In the latter case, the auxiliary sensor and lens may be attached to, for example, a sliding mechanism inside a rotatable portion, such as, the portion 302 shown in FIGS. 3A and 3B. The position and angle of the auxiliary sensor and lens can be, for example, controlled by a user, manually by a stepper-motor, or automatically based on computer control that determines a suitable distance between the auxiliary sensor and the primary sensor depending on a scene being captured.

Figure 5:
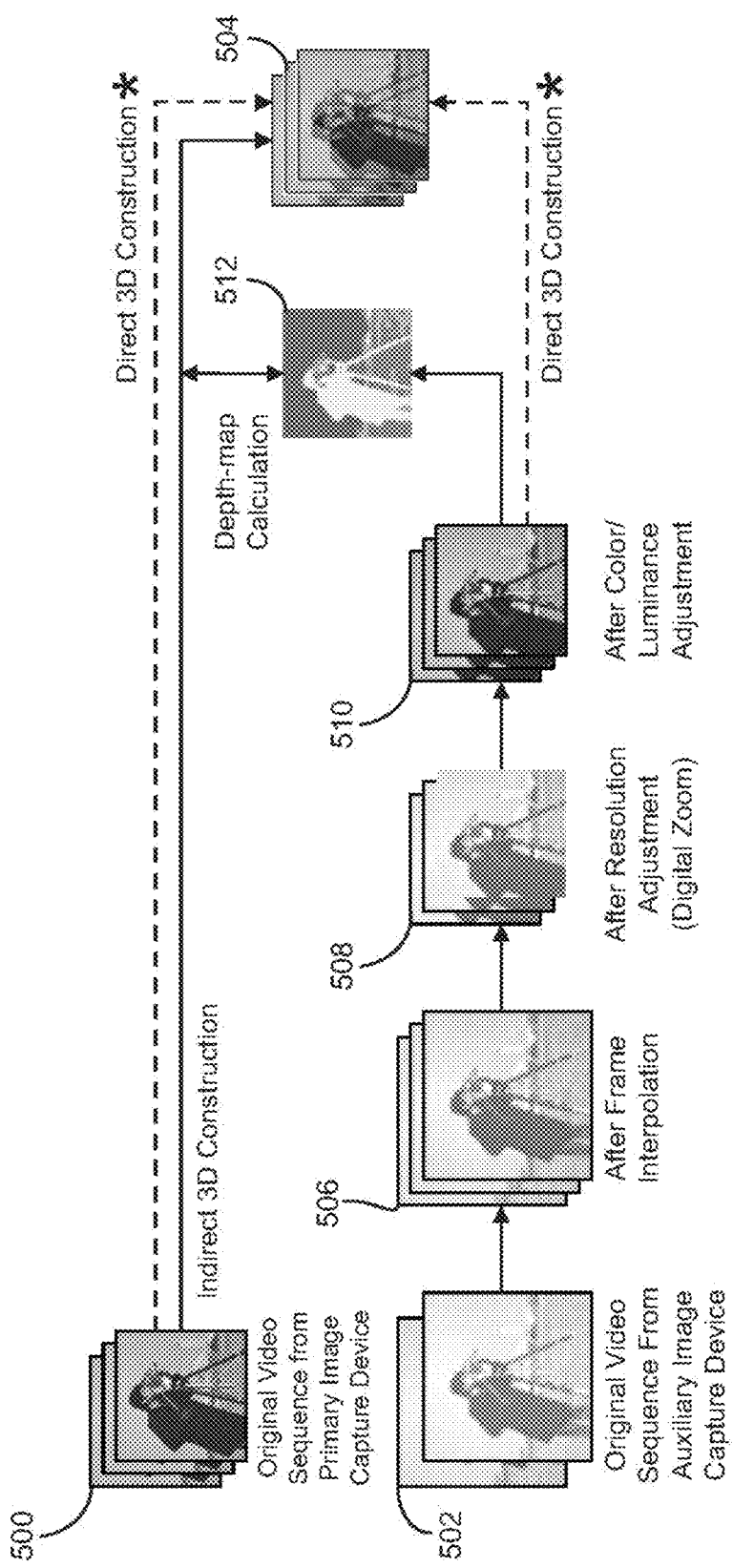
FIG. 5 illustrates steps in an example method for creating a stereoscopic image pair in accordance with embodiments of the present disclosure.

FIG. 5 illustrates steps in an example method for creating a stereoscopic image pair in accordance with embodiments of the present disclosure. In an example embodiment, the stereoscopic image pair may be created by modifying an image or video sequence captured using an auxiliary image capture device directly (as indicated by dashed lines in FIG. 5). This example technique may be best suited to high-quality auxiliary image capture devices and is applicable to both video and still applications.

In another example embodiment, a method may apply depth-based image synthesis processes on a plurality of image frames comprising a video sequence, as by the specific configuration of the hardware described herein. While matching lens/sensor optics combinations for the primary and auxiliary image capture devices may be utilized, in application, this is may be infeasible, owing to the zoom requirements of the main camera and the space limitations for the auxiliary. In such a scenario, if video capture is required, this methodology is most suitable. In the example of FIG. 5, the stereoscopic image pair may be created by modifying an image or video sequence captured using an auxiliary image capture device indirectly using a depth map and view synthesis (as indicated by solid lines in FIG. 5).

Referring to FIG. 5, in a process using the auxiliary image capture device directly, a primary image capture device may capture a video sequence 500. In addition, the auxiliary image capture device may capture a video sequence 502. The video sequences 500 and 502 may be captured of the same scene at approximately the same time. The images of the video sequence 500 may be directly used without modification for creating a three-dimensional video sequence 504 along with adjusted images captured by the auxiliary image capture device. In a first example step of adjusting the images captured by the auxiliary image capture device, the images may be frame interpolated 506. In a subsequent, example step, a resolution of the images may be adjusted such as by, for example, digital zoom 508. In another subsequent, example step, a color and/or luminance of the images may be adjusted 510. In direct 3D construction, the images may be suitable combined with the images captured by the primary image capture device to result in the three-dimensional video sequence 504.

In the example of creating the stereoscopic image pair by use of a depth map and view synthesis (as indicated by solid lines in FIG. 5), a depth map may be calculated by use of the images captured by the primary image capture device and the adjusted images of the auxiliary image capture device 512.

Finally, in accordance with another embodiment, possibly best suited to still image capture and/or a low quality auxiliary camera system, the image data from the auxiliary camera can be used to correlate to the primary camera, extract minimum and maximum disparities to identify near and far focus windows, and apply this data to calculate an optimal stereo baseline for the scene. The user can then be instructed in any number of ways to move to a proper offset for a second image capture to complete a stereo pair.

Figure 6:
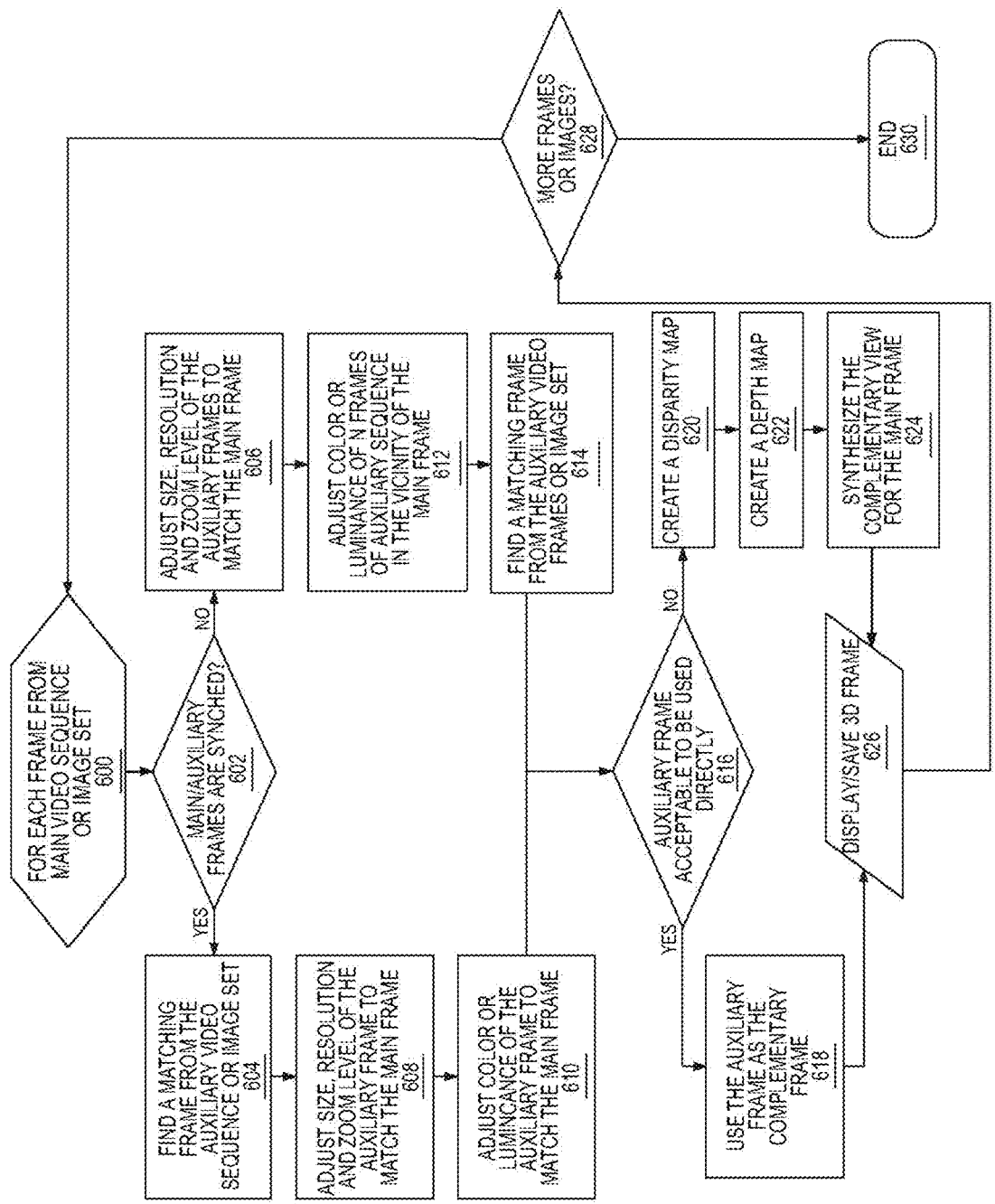
FIG. 6 is a flow chart of an exemplary method for 3D construction according to embodiments of the present disclosure.

FIG. 6 illustrates a flow chart of an exemplary method for 3D construction according to embodiments of the present disclosure. The steps of FIG. 6 can be decided during specification phase or may be implemented by suitable hardware, software, and/or firmware. For example, the steps may be implemented by the image processor 124 shown in FIG. 1. Referring to FIG. 6, the method may be applied sequentially for each frame from a main video sequence or image set (step 600). The main video sequence or image set may be captured by a primary image capture device. Next, the method includes determining 602 whether the main and auxiliary images or frames are synched. It may be important to make sure that each frame from the auxiliary sequence corresponds to one and only one frame from the main sequence; therefore, if it is known that the frame rate for the auxiliary camera is different than the frame rate of the main camera, a between-frame interpolation method can be used to achieve this objective. Since the optics of the two cameras are likely incongruent, it is necessary to first configure their outputs so that 3D registration, and hence depth extraction, can be performed for a given image pair. Therefore, in response to determining that the main and auxiliary images or frames are synched, the method may proceed to step 604. Conversely, in response to determining that the main and auxiliary images or frames are not synched, the method may proceed to step 606. It is noted that in case the synchronization information between the two cameras is already available, such as absolute or relative timestamps, or synchronization frames in both cameras along with known frame rates, the order in which the synchronization and image modification processes described below take place can be reversed. That is, first matching frames could be selected and then the view modification and color/luminance adjustments could be applied. An example of this technique is described in the example of FIG. 6.

At step 604, the method includes finding a matching image or frame from the auxiliary video sequence or image set. In an example, images or frames may be matched based on a time of capture. Other examples of matching images or frames are described in further detail herein.

Subsequent to step 604, the method may include adjusting 608 a size, resolution, and zoom level of the auxiliary frame to match the corresponding main frame. For example, one or more of a cropping factor, size, and scaling of a captured image may be adjusted to match a resolution and approximate a field of view of a corresponding image. Other examples described in further detail herein.

Subsequent to step 608, the method may include adjusting 610 color and/or luminance of the auxiliary frame to match the corresponding main frame. For example, the color in an area of an auxiliary image may be adjusted to match the color in a corresponding area of the corresponding primary image. In another example, regions of an overlapping field of view of the image capture devices may be identified. In this example, the color properties of the regions may be extracted. Next, in this example, color matching and correction operations may be performed to equalize the images. An exemplary method for this purpose involves leveling of each of the R, G, and B channels in the auxiliary frame such that the mean of the pixel colors equates to the mean of pixel colors in the main frame. This method is more suitable if it is believed that the auxiliary frame can be directly used to create a stereoscopic pair of images along with the main frame. Alternatively, RGB values of all pixels in both frames could be adjusted so that their corresponding mean values would be neutral grey ([128,128,128]). This is not necessarily the appropriate color "correction" for either camera, but rather, a means of equating the camera outputs to make feature matching more accurate. This may be done globally, or within local windows across the images to increase the accuracy of the correction. Other examples described in further detail herein.

Now referring to step 606, the method may include adjusting 612 color and/or luminance of a number N frames of the auxiliary sequence to match frames in the vicinity of a main frame. An example of this step is described in further detail herein. Subsequently, the method may include adjusting 614 color and/or luminance of the auxiliary frame to match the corresponding main frame. Additionally, if this should be performed before attempting to synchronize the two cameras, the averaging is further extended to measure and correct for the mean over a windowed number of frames, N. Subsequently, the method may include finding 614 a matching image or frame from the auxiliary video sequence or image set. Concurrent with these digital zoom and windowed color equalization operations, the actual process of synchronization may be performed. The same N windowed data used for color equalization can be used to recognize pixel patterns and movements within the frames from the individual cameras, particularly tailored to the likely overlap region of the cameras, the specifics of which may be dictated by the camera optics and the known separation (stereo base) of the cameras as physically defined by the camera design. If any image stabilization mechanism is used for the main camera, ideally either the information about such mechanism should be available at this time to be used on the auxiliary video sequence, or the same mechanism must be used on the auxiliary camera as well with precise synchronization between the two cameras.

The method of FIG. 6 may include determining 616 whether the auxiliary frame is acceptable to be used directly. Criteria of acceptability for direct use may include the comparative effective resolution of the two sensors (which will depend both on the absolute resolution, and the scaling change necessary due to any difference in angle of view between the optics/camera combinations of the primary and auxiliary camera), the amount and degree of uncorrectable color differential between the two images, any difference in the noise profiles of the two cameras, and the amount and degree of uncorrectable distortion, as examples. It is noted that a determination of whether to use the auxiliary image data can be made at the time of system specification or design, or during operation of the system. For example, a determination can take place during system specification by examining the design characteristics of the two sensors. A decision on whether the auxiliary data can be used as is can be determined by, for example, the relative resolution of the two sensors, their noise sensitivity, the characteristics of the two lenses, the desired quality, and the like. Also, experiments can be conducted in a laboratory setting to evaluate the relative performance of the two cameras and based on the outcome of such experiments to determine whether the auxiliary image data can be used directly. In addition, such determination can take place at the system level where a method that examines the quality characteristics of the two sensors for this particular scene can be implemented utilizing hardware and/or software resources of a combination of them to determine whether to use the auxiliary data directly. Such determination can also take place only on an area of the image and not the entire image. Various factors such as luminosity on an area, luminosity coupled with sensor sensitivity in an area, lens distortion in an area, the like, and combinations thereof can be used to form such determination, In response to determining that the auxiliary frame is acceptable, the method may proceed to step 618 where the auxiliary frame is used as the complementary frame.

Conversely, in response to determining that the auxiliary frame is unacceptable, the method may proceed to step 620 where a disparity map is created. For example, a disparity map may be generated for a horizontal positional offset of pixels of one or more images, such as stereoscopic still images. The method may include creating 622 a depth map. For example, the disparity map may be used to generate the depth map for a scene as described in further detail herein. The complementary view may then be synthesized 624 for the main frame. It is noted that the final image can include blocks processed using paths 618 and other blocks using paths 620, followed by 622, and 624. For example, in a low light scene the auxiliary sensor may have lower sensitivity compared to the main sensor. In this case, the part of image that is dark can be generated using image data from the main sensor utilizing the depth-based rendering approach and the bright areas of the image may be generated using image data obtained directly from the auxiliary sensor.

Subsequent to steps 618 and 624, the method may include displaying and/or saving 626 the 3D frame, which may include the main frame and the adjusted auxiliary frame. At step 628, the method includes determining whether there are additional frames or images to process. In response to determining that there are additional frames or images, the method may proceed to step 600 for processing the next frames. Otherwise, the method may end at step 630.

Figure 7:
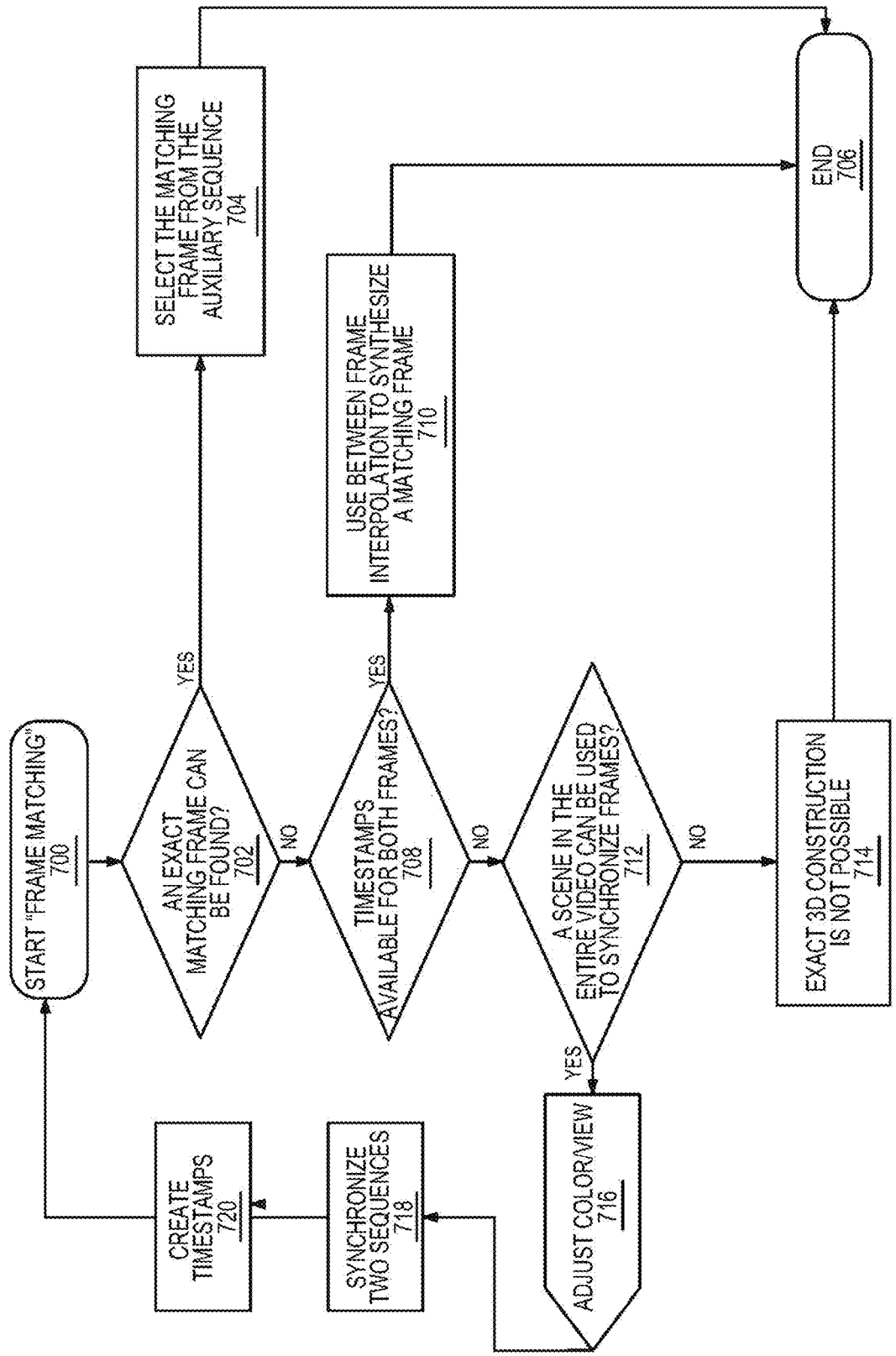
FIG. 7 is a flow chart of an exemplary method for frame matching in accordance with embodiments of the present disclosure.

FIG. 7 illustrates a flow chart of an exemplary method for frame matching in accordance with embodiments of the present disclosure. This method may be an example of steps 604 or 614 of the method of FIG. 6. The steps of FIG. 7 may be implemented by suitable hardware, software, and/or firmware. For example, the steps may be implemented by the image processor 124 shown in FIG. 1. Referring to FIG. 7, the method may begin at step 700.

Subsequently, the method of FIG. 7 may include determining 700 whether an exact matching frame can be found. For example, it may be determined whether an auxiliary frame matching a main frame can be found. For example, the auxiliary frame and main frame may have the same timestamp. In response to determining that the exact matching frame can be found, the matching frame may be selected from the auxiliary sequence (step 704), and the method ends (step 706).

In response to determining that the exact matching frame cannot be found, the process may proceed to step 708. At step 708, the method includes determining whether timestamps are available for both frames. In response to determining that timestamps are available for both frames, the method may include using between frame interpolation to synthesize a matching frame (step 710). When timestamps are available, there is a known offset between auxiliary and main captured devices. A weighted average technique based on the offset of the main and auxiliary captured devices can be used to synthesize the desired frame using image date from the previous and next frame in the target video sequence. More advanced techniques can use motion estimation techniques to estimate motion of moving objects and compensate for this factor as well.

In response to determining that timestamps are unavailable for both frames, the method includes determining 712 whether a scene in the video sequence can be used to synchronize frames. This step involves frame matching techniques where features are extracted from both main and auxiliary capture devices. The features of one frame in one sequence are compared with the features in a number of frames on the other sequence that are in the vicinity of the first sequence. In response to determining that the scene in the video sequence cannot be used to synchronize frames, it is determined that exact 3D construction is not possible (step 714) and the method ends (step 706).

In response to determining that the scene in the video sequence can be used to synchronize frames, the method may include adjusting 716 a color and/or view of the images, synchronizing 718 two sequences, and creating 720 timestamps indicating the offset between frames in auxiliary and main capture devices. The method may then proceed to step 702 for processing the next main frame.

Figure 8:
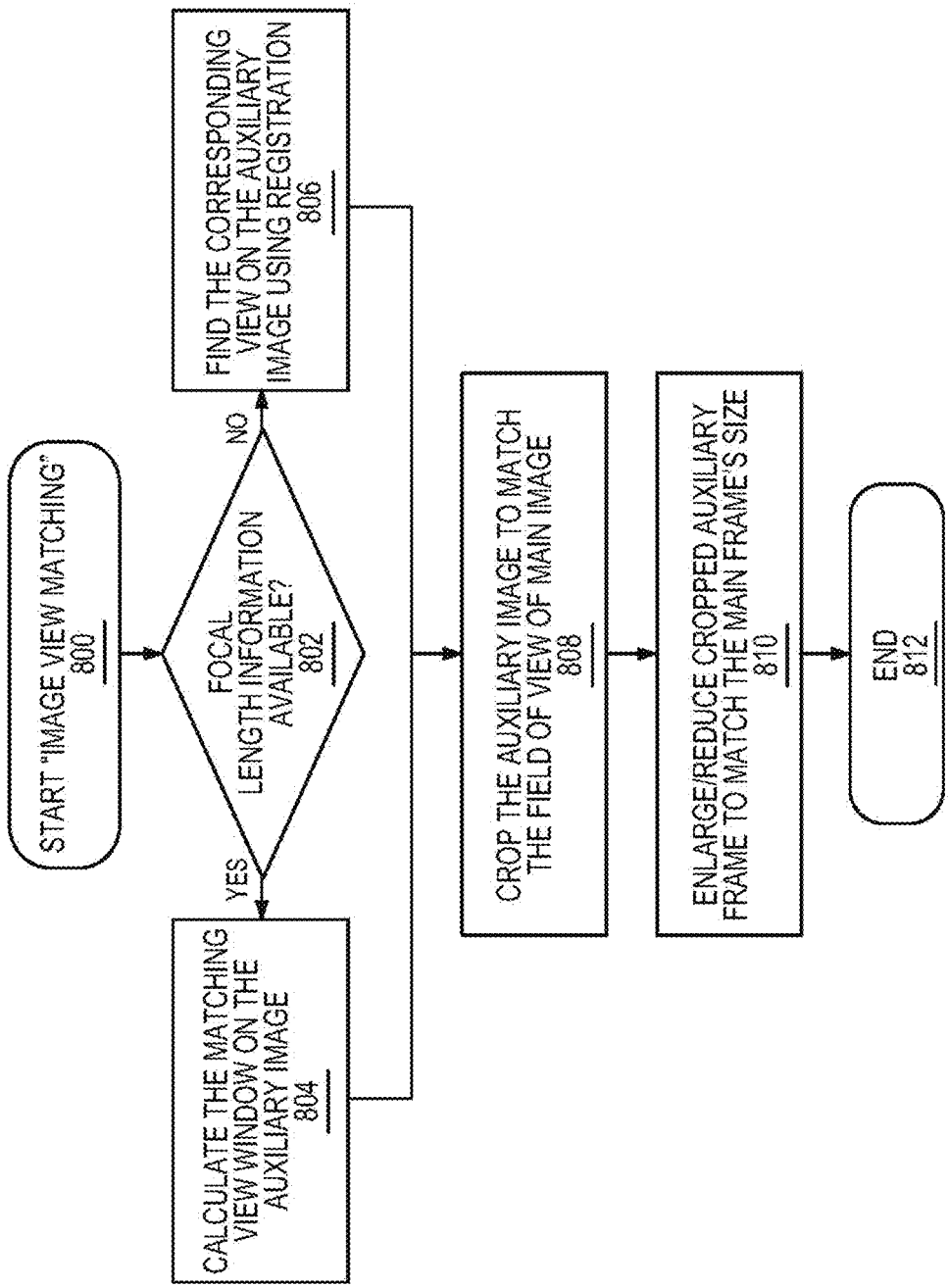
FIG. 8 is a flow chart of an exemplary method for image view matching according to embodiments of the present disclosure.

FIG. 8 illustrates a flow chart of an exemplary method for image view matching according to embodiments of the present disclosure. This method may be an example of steps 606 or 608 of the method of FIG. 6. The steps of FIG. 8 may be implemented by suitable hardware, software, and/or firmware. For example, the steps may be implemented by the image processor 124 shown in FIG. 1. Referring to FIG. 8, the method may begin at step 800.

Subsequently, the method includes determining 802 whether focal length information is available. In response to determining that focal length information is available, the method may include calculating 804 the matching view window on the auxiliary image. In response to determining that focal length information is unavailable, the method may include finding 806 or creating the corresponding view on the auxiliary image using registration and perspective transformation. This may be accomplished using a variety of methods including identification and matching of key points, block matching on the boundaries, as well as other less sophisticated methods that look at various statistics on the images, or combination of any other examples described herein.

The method of FIG. 8 also include cropping 808 the auxiliary image to match the field of view of the main image. The cropped auxiliary frame may be enlarged or reduced to match the size of the main frame (step 810). Subsequently, the method may end (step 812).

Steps 806 and 808 can represent linear matrix operations on the image data. Combinations of these steps can be combined or separated in any number of ways without loss of generality. In a particularly fast embodiment for real-time processing, these steps, as well as a linearized approximation of distortion correction may be combined into a single operation that can be implemented in a number of different ways including, but not limited to, applying a combined transformation that performs scaling, registration, lens correction, and the like at the same time or a generalized look-up-table operation. The combined transform, combining any of the transformations described above, can be calculated by multiplying the matrices of the individual transforms. Referring to FIG. 5 for example the Digital Zoom step 508 may be combined with the registration operation implied in "Direct 3D Construction". In addition, a lens correction transformation can be combined with any of the other transformations. In FIG. 6, steps 606 or 608 can contain both a scaling transformation and lens correction and can be combined with the registration operation implied in step 618.

In the absence of a simple linear approximation for distortion correction, a methodology for combining transformation steps into a point-wise look-up-table (LUT) or equivalent is still available. This involves pre-calculating, on a point-wise basis, the combination of inverse transform steps to achieve a final result. For example, suppose that point A is projected to position B by distortion correction, to position C by scaling, and to position D by perspective projective transformation to for alignment. By pre-calculating this traversal, one may build an LUT for each end point in the final image, wherein it would be stored e.g., point D results from an application of some transform to point A of the source.

Constraints on the system can also be used to minimize the memory storage required for such an LUT. For example, in a system in which scaling will always imply enlargement, it is known that a single pixel offset (e.g., from N to N+1) destination position may never result from more than one pixel offset in the source (e.g., from M to M+1). Similar constraints on the degree of distortion expected and the degree of projective correction needed for lens alignment can allow one to create an LUT in which an initial destination position N is set to correspond to source position S, and all subsequent pixels on a given row of data are limited to an x coordinate change of [0 ... 1] and a y coordinate change of [−1 ... 1]. In such a case, each subsequent pixel offset in the row can be coded with a single bit for the change in X position in the source data, and 2 bits for the possible changes in Y position. As an example, for an HD video stream, which would imply at least 12 bits to address X and Y coordinate positions, this represents a compression of the required LUT by a factor of 8X.

Figure 9:
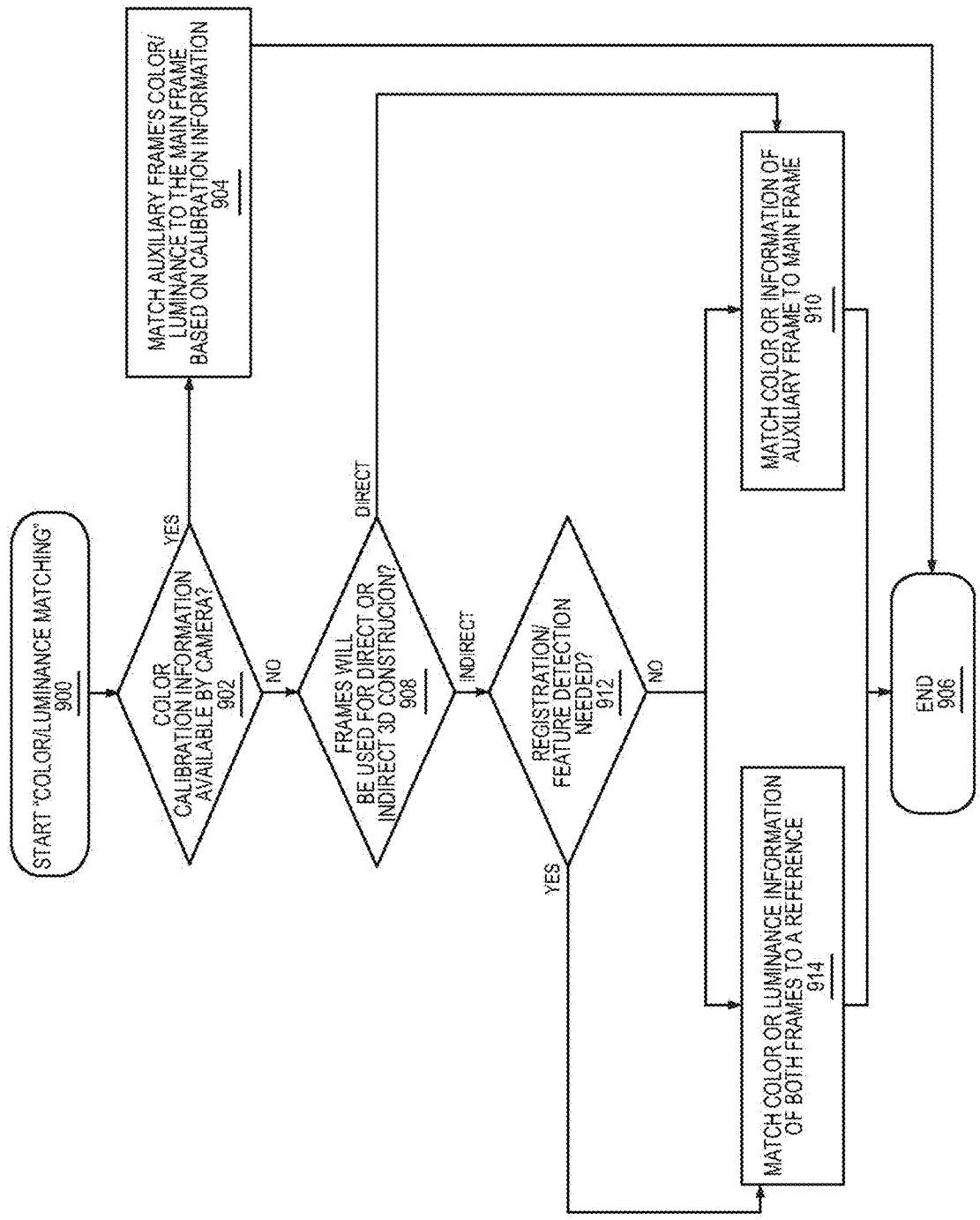
FIG. 9 is a flow chart of an exemplary method for color and luminance matching according to embodiments of the present disclosure.

FIG. 9 illustrates a flow chart of an exemplary method for color and luminance matching according to embodiments of the present disclosure. This method may be an example of steps 610 or 612 of the method of FIG. 6. The steps of FIG. 9 may be either decided during system specification phase, or during system design phase, or may be implemented by suitable hardware, software, and/or firmware on the system itself. For example, the steps may be implemented by the image processor 124 shown in FIG. 1. Referring to FIG. 9, the method may begin at step 900.

At step 902, the method may include determining whether color calibration information is available by the primary or auxiliary image capture devices. In response to determining that such color calibration information is available, the method may include matching 904 the auxiliary fame's color and/or luminance to the main frame based on the calibration information. Subsequently, the method may end (step 906).

In response to determining that color calibration information is unavailable, the method may proceed to step 908 where it is determined whether the frames will be used for direct or indirect 3D construction. In response to determining that the frames will be used for direct 3D construction, the method may proceed to step 910 as described herein below. In response to determining that the frames will be used for indirect 3D construction, the method may proceed to step 912 wherein it is determined whether registration/feature detection is needed. In response to determining that detection is needed, the method includes matching 914 color or luminance information of both frames to a reference. In response to determining that detection is not needed the method may implement step 914 and step 910 wherein color information of the auxiliary frame is matched to the main frame. Subsequently, the method may end (step 906).

At this point, the system should have available, from each camera, image pairs that are believed with some high confidence to be color equivalent, synchronized, and representing equivalent views. In an embodiment, using auxiliary data directly, captured pairs may then be sent to still image or video compression for creation of stereo 3D. Otherwise, extraction of pixel disparities then follows, for the purpose of converting disparity to depth. Any number of processes for disparity extraction may be utilized. Disparity, and in turn depth measures (as dictated by the equation, $$depth = \frac{baseline - focal\ length}{disparity}$$

must be measured with the specifics of the primary camera optics in mind, which is to say, the focal length of that cameras lens and the pixel pitch of that cameras sensor. For another embodiment of stereo creation, depths are then compared to find windows of minimum and maximum depth, the information of which can be fed to a process that calculates an appropriate stereo base and directs the user on how to take a second capture to create the desired stereo pair.

Implementing an embodiment of 3D creation, for a given image frame in the video sequence, having the raster data and the approximated depth map, a corresponding image view (or views) may be synthesized. Any suitable technique for depth-based image view synthesis may be utilized, although the preferred embodiment herein is the conversion of depth information to a Z-axis measure in pixels, followed by angular rotation of the raster data about the Y-axis. In this embodiment, the depth profile of the initial image pair of a video sequence should be analyzed to determine the positioning of the viewer screen plane, such that some percentage of pixels may fall in front or behind, and such that the rotation occurs about the central point (0,0,0) that represents the center of the 2D image at a depth equal to the chosen distance of the screen plane. This methodology affords one the ability to choose the perceived depth of the frame pairs (using a larger rotation angle to create a sense of larger stereo baseline, or vice-versa), possibly with input from the autofocus mechanism of the camera as to the approximate focus distance of the objects in frame (short distances dictate a targeted smaller stereo base, and longer distances, the opposite). One image may be synthesized, using the initial raster data as the other of a pair, or alternatively, two images may be synthesized with opposite rotations to generate left and right images. It is noted that the screen plane and angular rotation chosen for the first image of a sequence cannot be altered after the fact.

Creation of the final 3D video sequence involves video encoding of the individual frame sequences in a manner consistent with 3D video representation. Any suitable technique may be utilized.

Figure 10A:
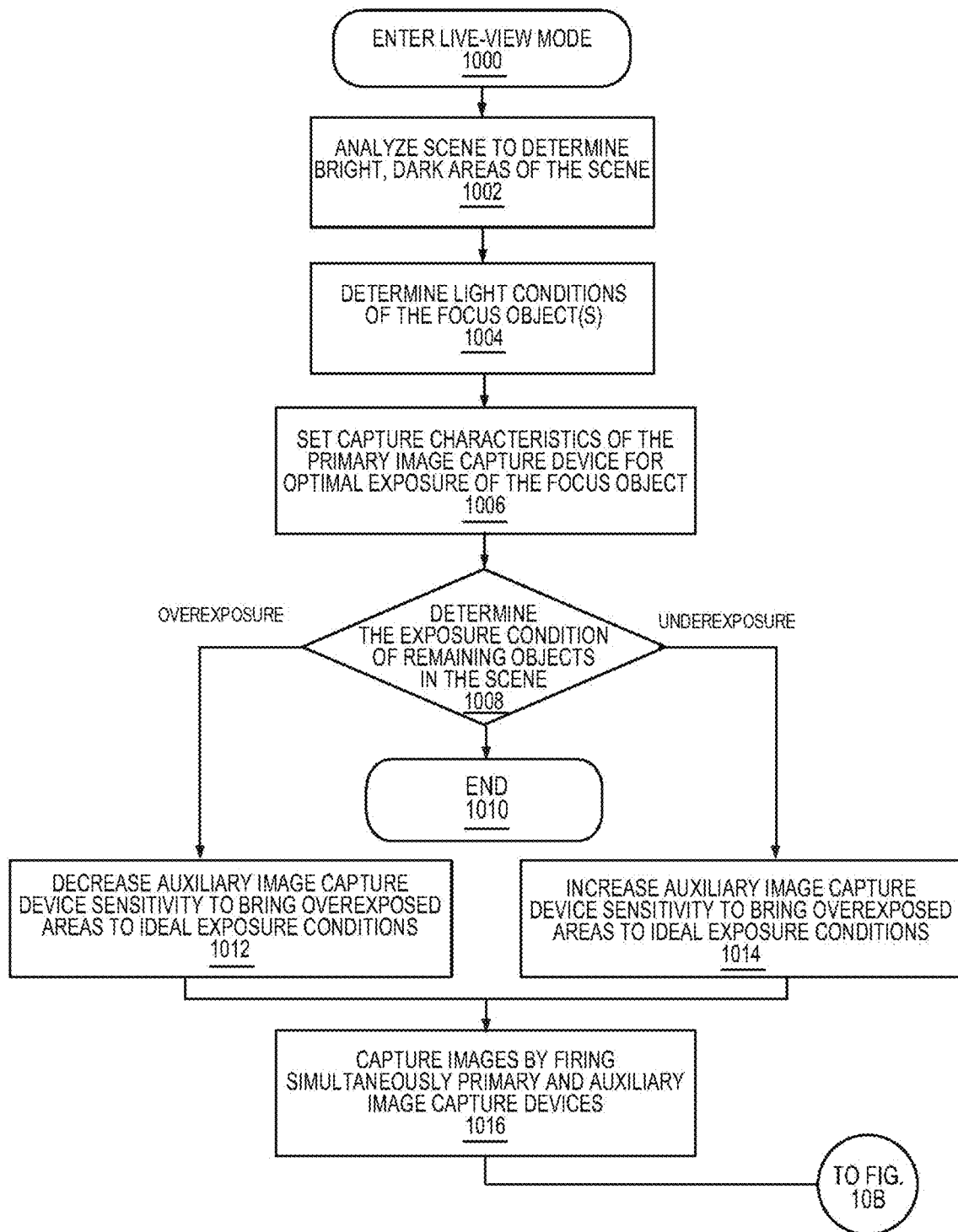
FIGS. 10A and 10B depict a flow chart of an exemplary method for generating a high-dynamic range image using primary and auxiliary image capture devices according to embodiments of the present disclosure.
Figure 10B:
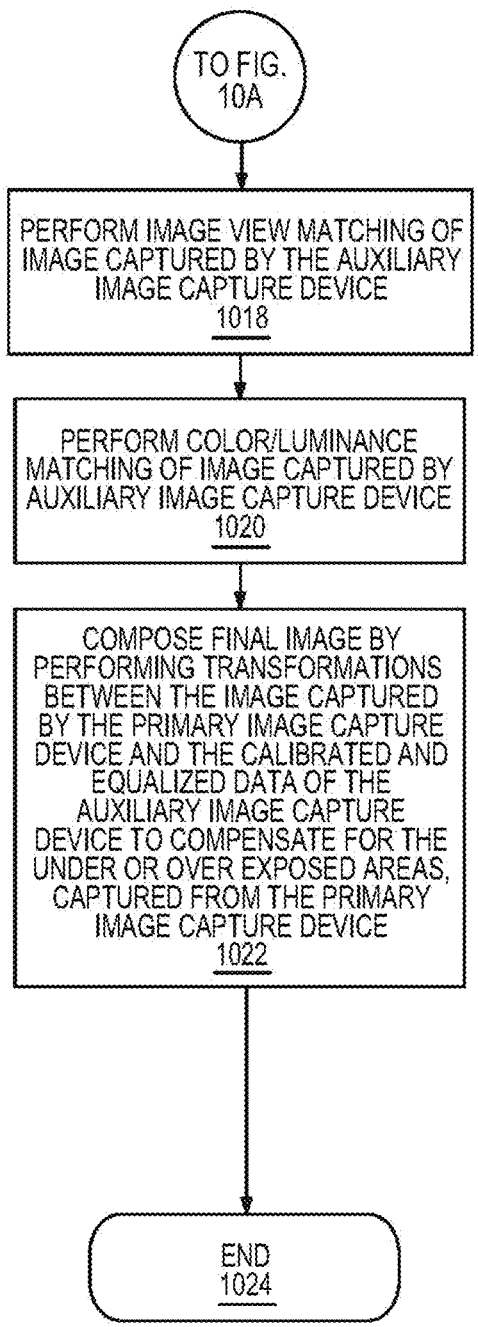

FIGS. 10A and 10B depict a flow chart of an exemplary method for generating a high-dynamic range image using primary and auxiliary image capture devices according to embodiments of the present disclosure. The steps of FIGS. 10A and 10B may be implemented by suitable hardware, software, and/or firmware. For example, the steps may be implemented by the image processor 124 shown in FIG. 1. Referring to FIGS. 10A and 10B, the method may begin at step 1000 wherein a system having primary and auxiliary image capture devices according to embodiments of the present disclosure may enter a live view mode for displaying images to a user.

The method of FIGS. 10A and 10B includes analyzing 1002 to determine bright and dark areas of the scene. Further, the method may include determining 1004 light conditions of one or more focus objects or objects of interest. Subsequently, the method may include setting 1006 capture characteristics of the primary image capture device for optimal exposure of the focus object.

The method of FIGS. 10A and 10B also include determining 1008 the exposure condition of remaining objects in the scene. In response to determining that the objects have the same exposure, the method may end (step 1010). In response to determining there is overexposure, the method may include decreasing 1012 sensitivity of the auxiliary image capture device to bring overexposed areas to ideal exposure conditions. In response to determining there is underexposure, the method may include increasing 1014 sensitivity of the auxiliary image capture device to bring overexposed areas to ideal exposure conditions.

Subsequently, the method includes capturing 1016 images by firing simultaneously the primary and auxiliary image capture devices. Next, the method may include performing 1018 image view matching of the image captured by the auxiliary image capture device. For example, the method described with respect to FIG. 8 may be implemented. Next, the method may include performing color and/or luminance matching of the image captured by the auxiliary image capture device. For example, the method described with respect to FIG. 9 may be implemented. The method may then include composing 1022 a final image by performing suitable transformations between the image captured by the primary image capture device and the calibrated and equalized data of the auxiliary image capture device to compensate for underexposed or overexposed areas in images captured by the primary image capture device as well as to minimize the disparity between the pixels in both images. The method may then end (step 1024).

System and method embodiments for blur correction are disclosed herein. In an example, image blurring may result at high motion. The auxiliary image capture device may be used to correct image blurring as follows: given a high resolution low speed main camera (MC) and a low resolution high speed second camera (SC), image blurring can be reduced by estimation motion flow in SC and use this information to recover the blur kernel in MC. The blur kernel is then used to remove blurring from the MC images.

Figure 11:
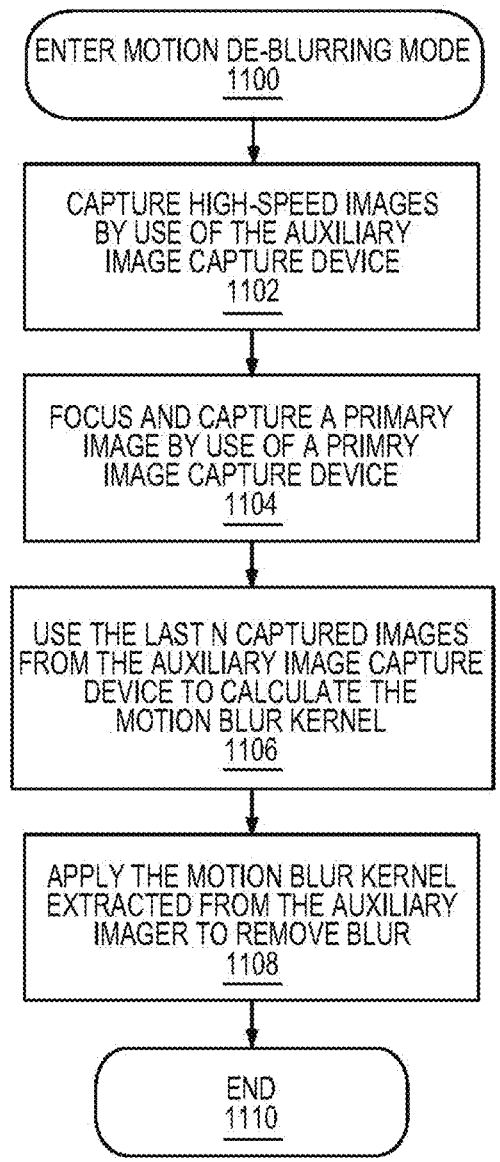
FIG. 11 is a flow chart of an exemplary method for removing motion blur using a system having primary and auxiliary image capture devices according to embodiments of the present disclosure.

FIG. 11 illustrates a flow chart of an exemplary method for removing motion blur using a system having primary and auxiliary image capture devices according to embodiments of the present disclosure. The steps of FIG. 11 may be implemented by suitable hardware, software, and/or firmware. For example, the steps may be implemented by the image processor 124 shown in FIG. 1. Referring to FIG. 11, the method may begin at step 1100 wherein a system having primary and auxiliary image capture devices according to embodiments of the present disclosure may enter a motion de-blurring mode.

The method of FIG. 11 includes capturing 1102 high-speed images by use of the auxiliary image capture device. Further, the method may include focusing and capturing 1104 a primary image using a primary image capture device. The last N number of image captured by the auxiliary image capture device may be used to calculate the motion blur kernel (step 1106). Subsequently, the method may include applying 1108 the motion blur kernel extracted from an auxiliary imager to remove blur. The method may then end (step 1110).

Figure 12:
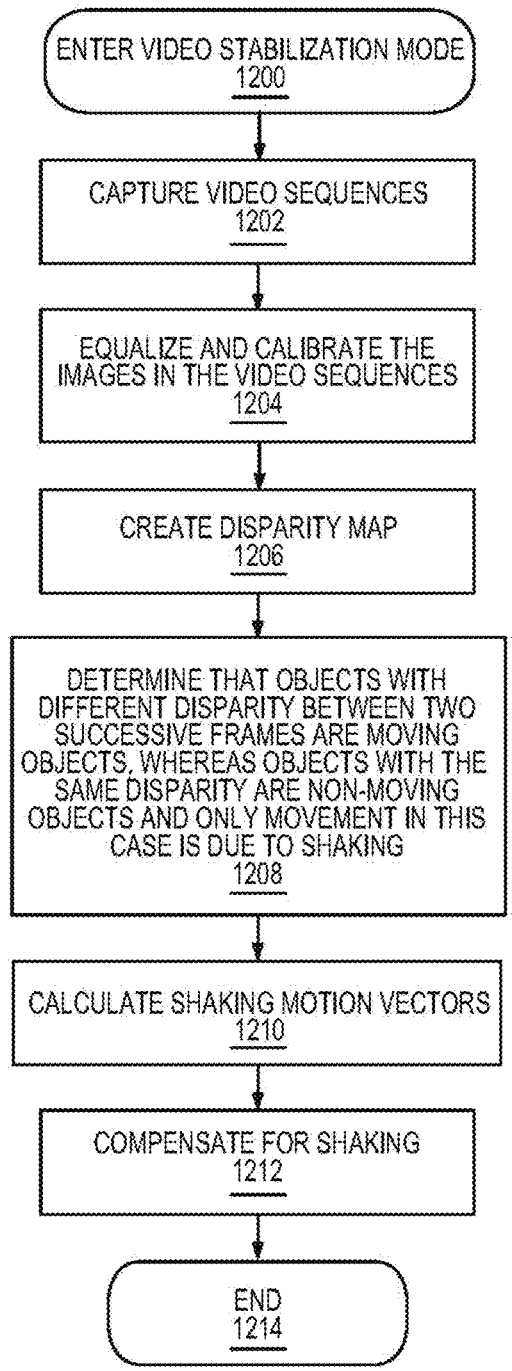
FIG. 12 is a flow chart of an exemplary method for video stabilization in a system having primary and auxiliary image capture devices according to embodiments of the present disclosure.

In accordance with embodiments disclosed herein, video stabilization may be provided. For example, FIG. 12 illustrates a flow chart of an exemplary method for video stabilization in a system having primary and auxiliary image capture devices according to embodiments of the present disclosure. The steps of FIG. 12 may be implemented by suitable hardware, software, and/or firmware. For example, the steps may be implemented by the image processor 124 shown in FIG. 1. Referring to FIG. 12, the method may begin at step 1200 wherein a system having primary and auxiliary image capture devices according to embodiments of the present disclosure may enter a video stabilization mode. In this mode, the primary and auxiliary image capture devices may capture sequences of images of a scene (step 1202) and equalize and calibrate the images in the video sequences (step 1204).

The method of FIG. 12 includes assisting 1210 in video and/or still image stabilization by adding an element to the calculations when compensating 1212 for camera shake. Typical image stabilization algorithms rely on the evaluation and analysis of temporal displacement between frames (of video or other camera capture data), and are subject to error introduced to the calculations by objects moving in the scene. Utilizing the auxiliary camera, offset between the two camera views for a single temporal instance (frame) can be calculated as an additive "structural" component for this process. Changes in this "structural" offset between temporally correlated blocks/regions of the image is indicative of moving objects in these location that may then be excluded from overall stabilization calculations. The method may then end (step 1214). Next, the method includes creating 1206 a disparity map. The method also includes determining 1208 that objects in the images with different disparity between two successive frames are moving objects, whereas objects with the same disparity are non-moving objects and the only movement in this case is due to shaking.

The method of FIG. 12 includes calculating 1210 shaking motion vectors. Further, the method includes compensating 1212 for shaking. Shaking motion vectors can be obtained by performing motion compensation analysis between the captured frames, removing motion vectors of moving objects, and using the remaining motion vectors to calculate the shaking vectors. The method may then end (step 1214).

Figure 13A:
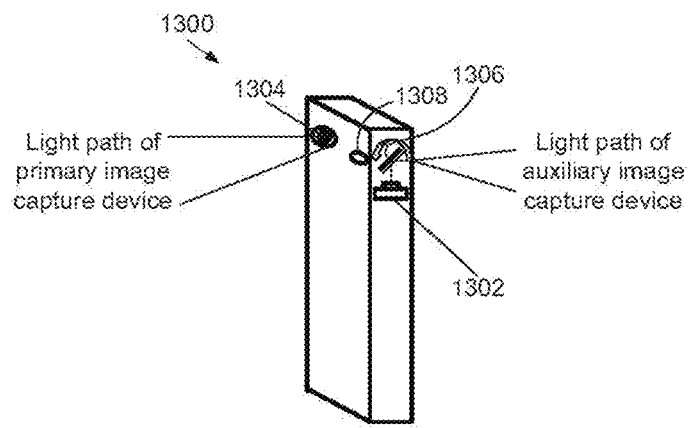
FIGS. 13A and 13B are perspective views of an example mobile telephone with an auxiliary image capture device in a position to face a user and another position to face a scene together with a primary image capture device according to embodiments of the present disclosure.
Figure 13B:
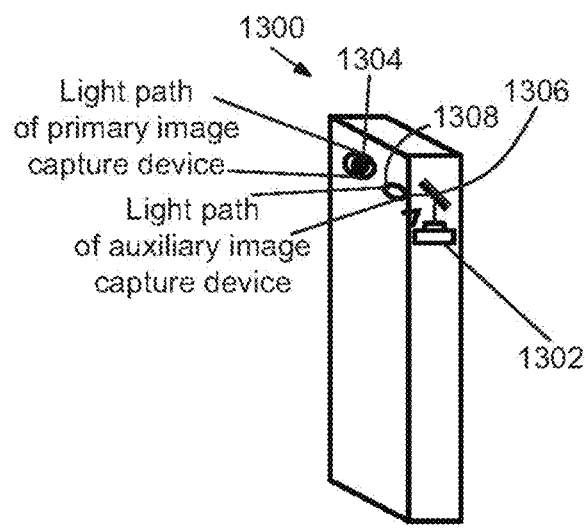

In accordance with embodiments of the present disclosure, the primary and auxiliary image capture devices may be components of a mobile telephone. The auxiliary image capture device may be configured to face in a first position towards a user and to face in a second position towards a scene to be image captured. The auxiliary image capture device may include a mechanism for directing a path of light from the scene towards the auxiliary image capture device such that the primary image capture device and the auxiliary image capture device can capture images of the scene. FIGS. 13A and 13B illustrate perspective views of an example mobile telephone 1300 with an auxiliary image capture device 1302 in a position to face a user and another position to face a scene together with a primary image capture device 1304 according to embodiments of the present disclosure.

Referring to FIG. 13A, the auxiliary image capture device 1302 and its mirror mechanism 1306 may be positioned within the telephone 1300. The mirror mechanism 1306 may be mechanically or electronically rotated or otherwise moved to a position for directing light passing through an opening (not shown) toward the device 1302 for capturing an image of a user, for example. In another position shown in FIG. 13B, the mirror mechanism 1306 may be mechanically rotated or otherwise moved to a position for directing light passing through an opening 1308 toward the device 1302 for capturing an image of a scene together with the device 1304.

Figure 13C:
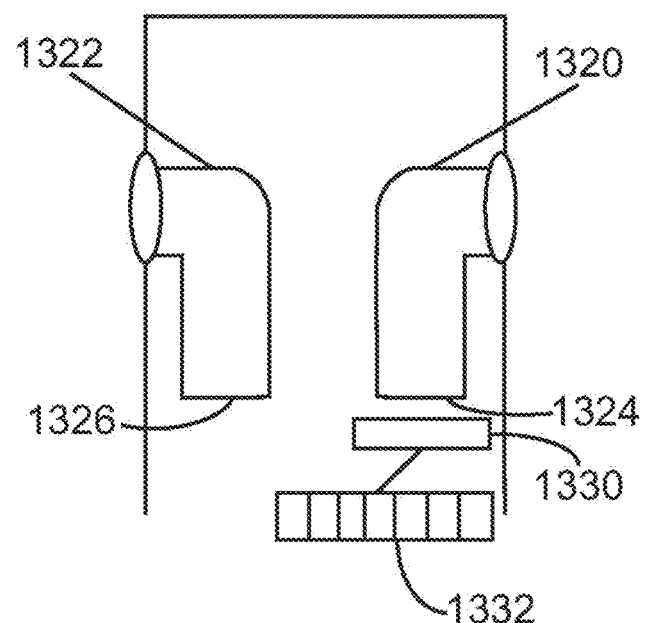
FIG. 13C illustrates a cross-sectional view of another example mobile telephone according to embodiments of the present disclosure.

FIG. 13C illustrates a cross-sectional view of another example mobile telephone according to embodiments of the present disclosure. Referring to FIG. 13C, the mirror can be replaced with two fixed light paths 1320 and 1322 that can be constructed using a fiber optic material. One path 1320 collecting the light from the scene and directing in one position 1324 and the other one 1322 collecting the light from the inwards field of view and directing it in a different location 1326. By then moving the sensor 1330 using a slide 1332 or any other manual or electronically controlled mechanism to either 1324 or 1326 positions, capturing of the proper images according to the function of the phone is accomplished.

Figure 14A:
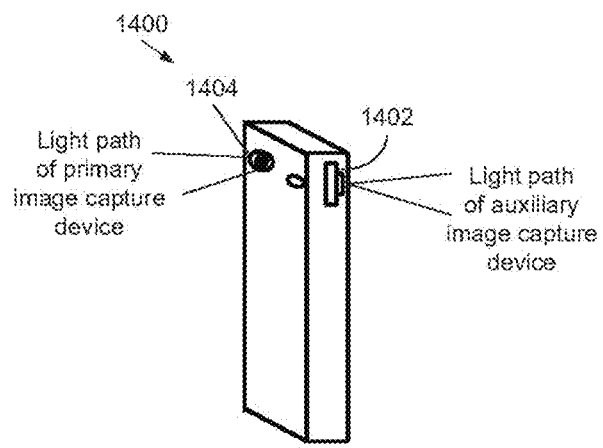
FIGS. 14A, 14B, and 14C are different views of another example mobile telephone with an auxiliary image capture device in a position to face a user and another position to face a scene together with a primary image capture device according to embodiments of the present disclosure.
Figure 14B:
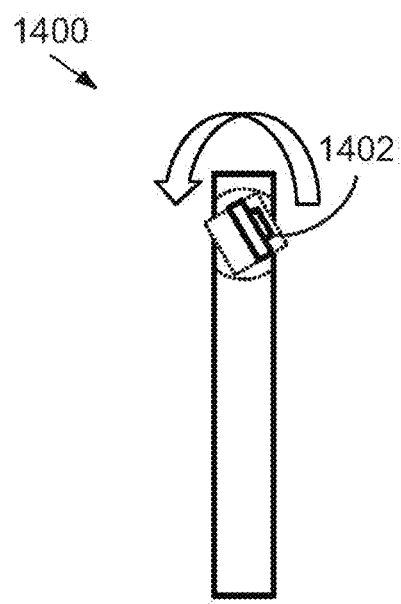
Figure 14C:
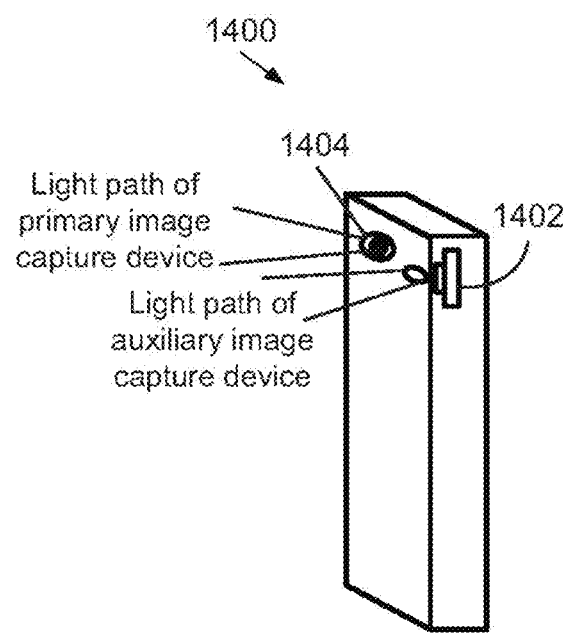

FIGS. 14A, 14B, and 14C illustrate different views of an example mobile telephone 1400 with an auxiliary image capture device 1402 in a position to face a user and another position to face a scene together with a primary image capture device 1404 according to embodiments of the present disclosure. In this example, the auxiliary image capture device 1402 may be rotated along a vertical or a horizontal axis to a position shown in FIG. 14A for capturing an image of a user. The device 1402 may be rotated to a position shown in FIG. 14C for capturing an image of a scene together with the device 1404.

Figure 15A:
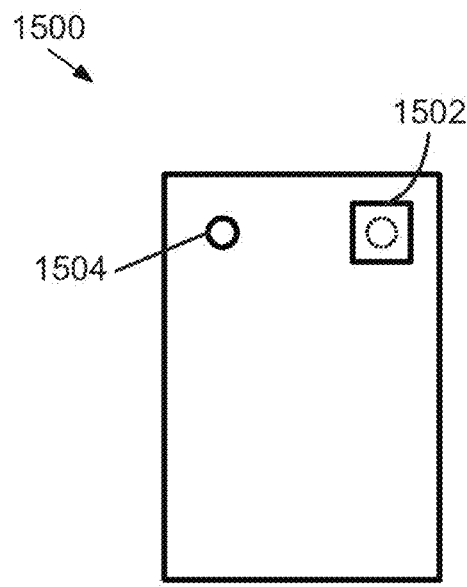
FIGS. 15A, 15B, 15C, and 15D illustrate different views of an example mobile telephone with an auxiliary image capture device in a position to face a user and another position to face a scene together with a primary image capture device according to embodiments of the present disclosure.
Figure 15B:
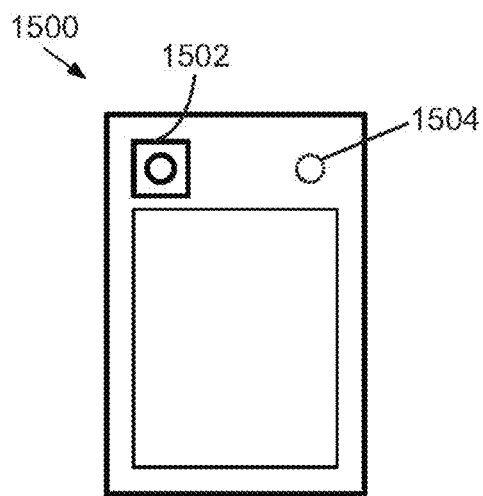
Figure 15C:
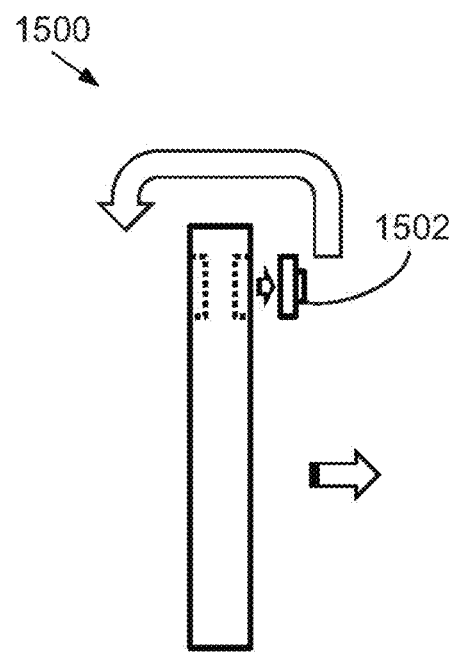
Figure 15D:
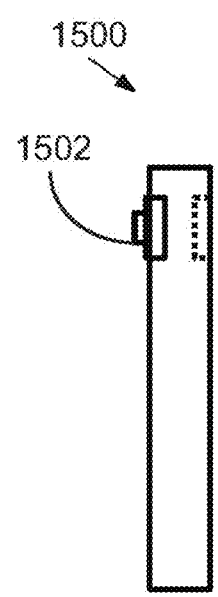

FIGS. 15A, 15B, 15C, and 15D illustrate different views of an example mobile telephone 1500 with an auxiliary image capture device 1502 in a position to face a user and another position to face a scene together with a primary image capture device 1504 according to embodiments of the present disclosure. In this example, the device 1502 is detachable from the body of the telephone 1500 for positioning on a front side or a rear side of the telephone 1500. The device 1502 may be attached to a front side of the telephone 1500 for capturing images of the user as shown in FIGS. 15B and 15C. The device 1502 may be attached to a rear side of the telephone 1500 for capturing images of a scene together with the device 1504 as shown in FIGS. 15A and 15D.

Figure 15E:
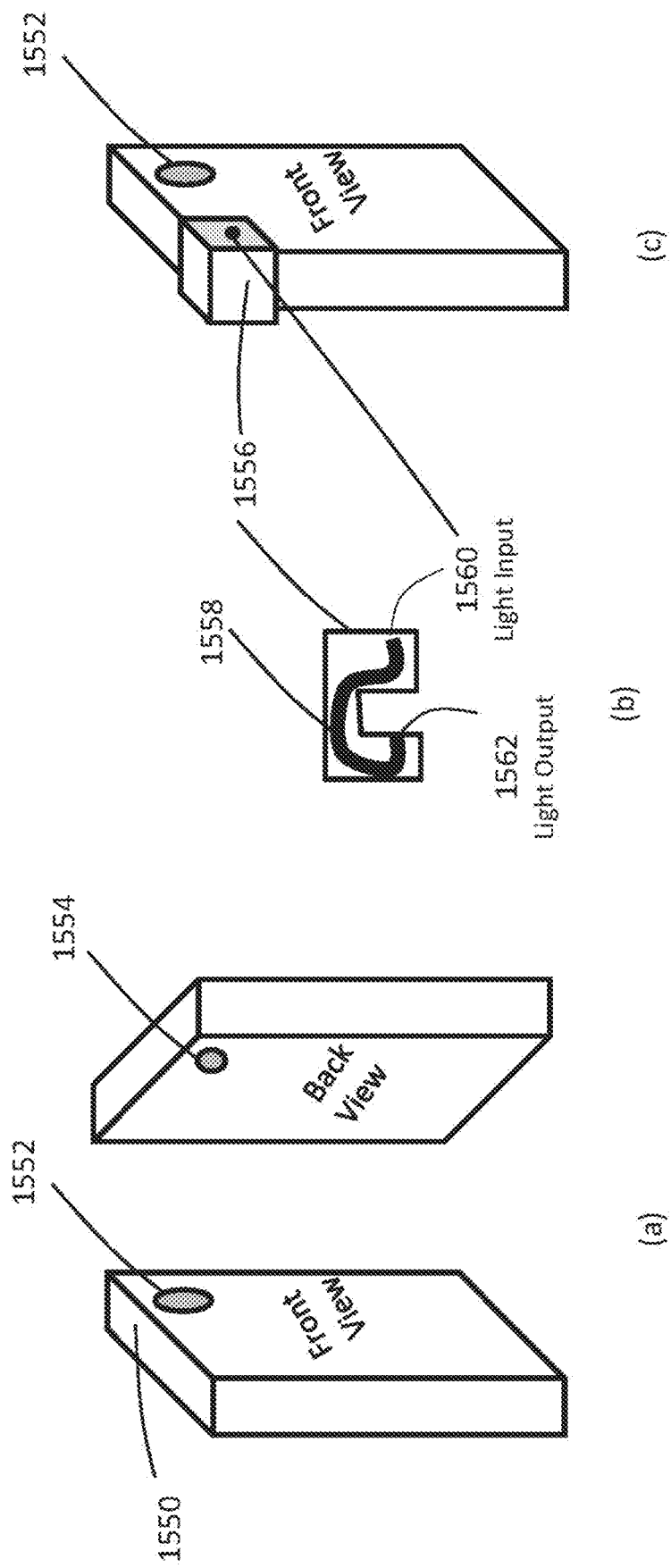
FIG. 15E illustrates a cross-sectional view of another example mobile telephone according to embodiments of the present disclosure.

FIG. 15E illustrates a cross-sectional view of another example mobile telephone according to embodiments of the present disclosure. Referring to FIG. 15E, the inwards facing camera 1554, typically found in today's modern cellphones 1550, can be as the auxiliary capture device. This capture device 1554 resides on the opposite side of the primary capture device 1552 and a light guide 1558 that can be implemented as an attachable module 1556, can be used to direct light from the side facing the primary camera 1560 to the inwards camera. When the module 1556 is present (FIG. 15E-C), the cellphone operates according to the embodiments of the present disclosure. When the module 1556 is not present, the cellphone resumes its typical operation where the inwards facing camera is used to take pictures or video of the person holding the cellphone.

Figure 16:
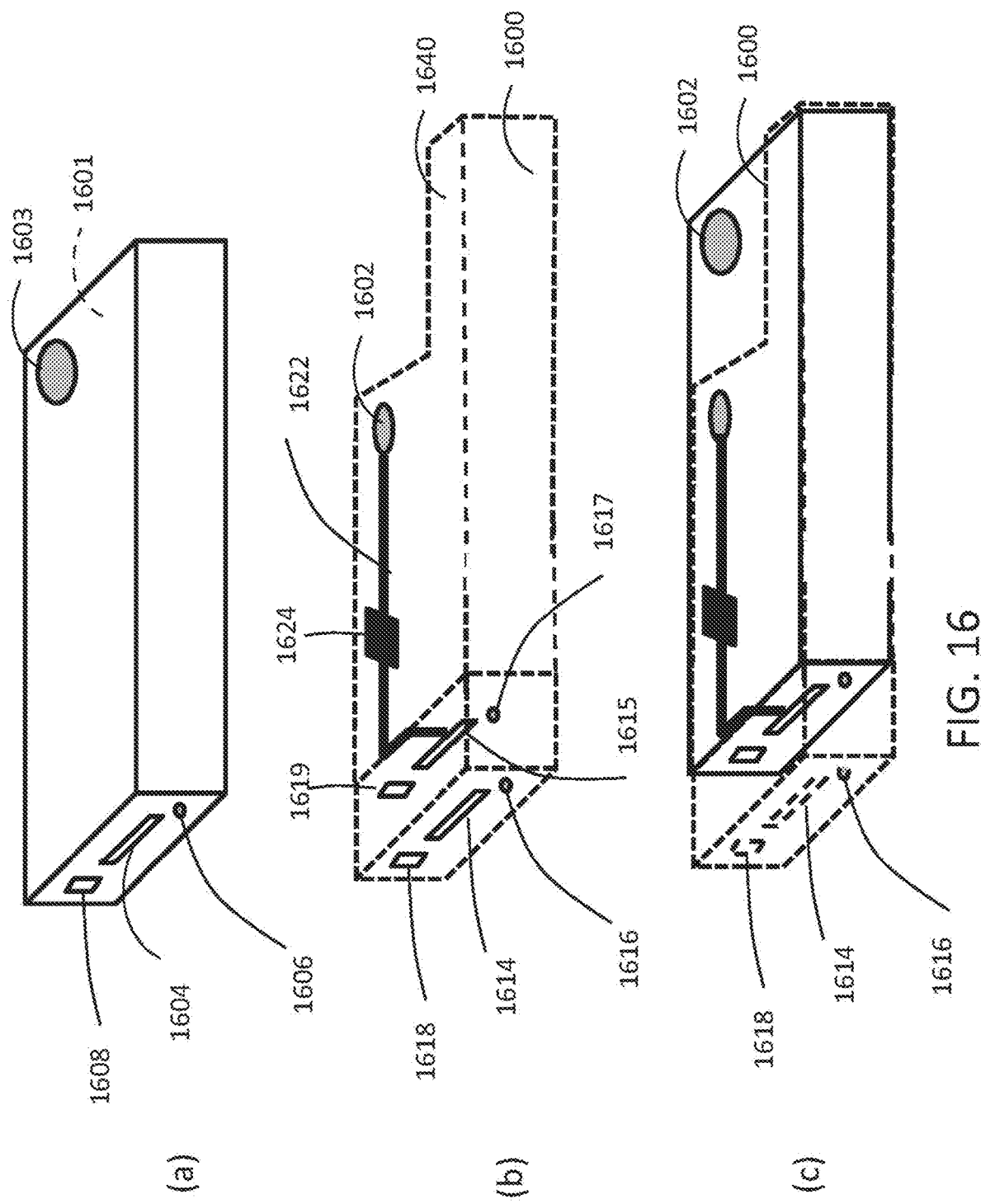
FIG. 16 illustrates perspective views of an example accessory with an auxiliary image capture device that can be attached to a mobile telephone to face a scene together with a primary image capture device according to embodiments of the present disclosure.

FIG. 16 illustrates perspective views of an attachable, computing device accessory 1600 including an auxiliary image capture device 1602 that is configured to be attached to a cellphone or other computing device 1601 to face a scene together with a primary image capture device 1603 according to embodiments of the present disclosure. A typical cellphone or other computing device may have a connector 1604 that allows the phone to receive power as well as to communicate with external devices. In addition, other ports may exist on the side of the phone with the connector. Such ports may be buttons, ports to connect the phone to external speakers or earphones 1606 and the like. Also, there may be openings for speakers, microphones 1608 or any other interface that allows the phone to communicate, or transmit, or receive any signal that is coming from the outside world. The accessory 1600 may have a casing that allows the accessory to attach to the cellphone.

The accessory 1600 may have a replicated set of ports, connectors, or openings that match the ones of the cellphone. Each set includes the port that attaches to the phone and the one that attaches to the outside world. For example the connector 1615 of the accessory 1600 attaches to the connector 1604 of the cellphone. Also, the connector 1614 of the accessory 1600 can be physically connected with the connector 1615 of the accessory 1600 to allow other devices to communicate with the cellphone when the auxiliary capture device is not used. Similarly, port 1617 of accessory 1600 is connected to port 1606 of the cellphone, whereas port 1616 is physically connected with port 1617 of the accessory 1600. The openings formed by 1618 and 1619 can also allow signals generated or received on 1608 to pass to the outside world.

The auxiliary capture device 1602 receives power from the 1604 connector with which is attached utilizing a digital or analog cable 1622. Image date pass through the cable 1622 as well. It may also be required to have one or more integrated circuits 1624 and/or other passive electronic components to translate the signals from capture device to something that the cellphone understands.

The auxiliary capture device can be also on track so it can slide on the horizontal axis to change the stereo base when creating a stereoscopic image.

Although FIG. 16 shows a position of the auxiliary capture device suitable for processing when phone is oriented in landscape mode, it should be also noted that the auxiliary sensor can reside anywhere in the phone and can be placed in a way that processing can be implemented in portrait mode (position 1640). Also, it is possible to include two auxiliary sensors (one in position 1602 and another one in position 1640) to enable processing in both landscape and portrait orientations.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. An apparatus for creating an image of a scene, the apparatus comprising:
   at least two image capture devices comprising of an image sensor and other components assisting in the capture process, wherein;
   the first image capture device comprising a first image-quality characteristic;
   the second image capture device comprising a second image-quality characteristic;
   a processor, wherein said processor is configured to:
      receive video data from the first and the second image capture devices;
      for a pair of corresponding images obtained from the video data from the first and second capture devices;
      adjust the image obtained from one image capture device to match at least one of the characteristics of the image obtained from the other image capture device, thus forming a modified pair of images;
      calculate the disparity between the modified pair of images;
      determine the areas of the images with constant disparity;
      determine that objects in the modified pair of images with different disparity are moving objects;
      perform motion compensation analysis between the pair of modified images:
      remove motion vectors of moving objects;
      use the remaining motion vectors to calculate the shaking vector;
      utilize the shaking vector to perform video stabilization in one of the received videos.

2. The apparatus of claim 1, wherein processor adjusts one of a cropping factor, size, and scaling of one of the images of the image pair.

3. The apparatus of claim 1, wherein processor uses focal lengths and optical properties of the primary and auxiliary image capture devices to calculate an overlapping field of view and resolution, crop, and scale changes.

4. The apparatus of claim 1, wherein processor identifies distortion characteristics of the image capture devices; and performs a transformative procedure to correct distortion for equalizing the captured image pair.

5. The apparatus of claim 1, wherein processor adjusts a color of one image of the captured image pair to one of match and approximate a color of the other image.

6. The apparatus of claim 1, wherein processor adjusts a color of one image of the captured image pair to one of match and approximate a color of the other image.

7. The apparatus of claim 1, wherein processor extracts image features using one or more pixels from the images in the captured image pair;
   matches extracted image features between the images in the captured image pair;
   computes a transformation to adjust at least one of the matched image features between the images in the captured image pair;
   applies the transformation to at least one of the images in the captured image pair creating an adjusted image; and
   forms a transformed image pair by selecting two images from a second group of images including the adjusted and captured images.

8. An apparatus for creating an image of a scene, the apparatus comprising:
   at least two image capture devices comprising of an image sensor and other components assisting in the capture process, wherein;
   the first image capture device comprising a first image-quality characteristic;
   the second image capture device comprising a second image-quality characteristic;
   a processor, wherein said processor is configured to:
      receive video data from the first and the second image capture devices;
      for a pair of corresponding images obtained from the video data from the first and second capture devices;
      adjust the image obtained from one image capture device to match at least one of the characteristics of the image obtained from the other image capture device, thus forming a modified pair of images,
      calculate the disparity between the modified pair of images;
      determine the areas of the images with constant disparity;
      determine that objects in the modified pair of images with different disparity are moving objects;
      perform motion compensation analysis between the pair of modified images;
      remove motion vectors of moving objects;
      use the remaining motion vectors to calculate the motion blur vector,
   apply the motion blur vector to the image obtained from the first image capture device to create an enhanced image.

* * * * *